United States Patent
Yamada et al.

(10) Patent No.: US 6,852,065 B2
(45) Date of Patent: Feb. 8, 2005

(54) LOCK MECHANISM, SHIFT LEVER DEVICE, AND SHIFT LOCK UNIT

(75) Inventors: Eiji Yamada, Niwa-gun (JP); Yoshinobu Yokoyama, Niwa-gun (JP); Kenichi Kako, Niwa-gun (JP); Haruyuki Kitajima, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/130,170

(22) PCT Filed: Sep. 19, 2001

(86) PCT No.: PCT/JP01/08116

§ 371 (c)(1),
(2), (4) Date: Sep. 23, 2002

(87) PCT Pub. No.: WO02/24479

PCT Pub. Date: Mar. 28, 2002

(65) Prior Publication Data

US 2003/0097897 A1 May 29, 2003

(30) Foreign Application Priority Data

Sep. 19, 2000 (JP) .................................. 2000-283606
Sep. 28, 2000 (JP) .................................. 2000-296197
May 29, 2001 (JP) .................................. 2001-160452
Jun. 20, 2001 (JP) .................................. 2001-186788

(51) Int. Cl.$^7$ ............................................. F16H 59/10
(52) U.S. Cl. ................................. 477/99; 74/473.25
(58) Field of Search .................... 477/99; 192/220.2, 192/220.3, 220.4; 74/473.21, 473.25; 70/247, 248

(56) References Cited

U.S. PATENT DOCUMENTS 4,473,141 A * 9/1984 Mochida ................... 477/94
5,036,962 A * 8/1991 Amagasa ................... 70/251
5,211,271 A * 5/1993 Osborn et al. ........... 192/220.3
5,489,246 A * 2/1996 Moody et al. ................ 477/96
5,562,568 A * 10/1996 Smale .......................... 477/99
6,487,883 B2 * 12/2002 Suzuki et al. ................ 70/247

FOREIGN PATENT DOCUMENTS

| EP | 0978 670 A2 | 2/2000 |
|---|---|---|
| JP | 4-62457 | 5/1992 |
| JP | 5-38451 | 5/1993 |
| JP | 6-47767 | 6/1994 |
| JP | 7-4142 | 1/1995 |
| JP | 8-253043 | 10/1996 |
| JP | 8-320062 | 12/1996 |
| JP | 9-156394 | 6/1997 |

OTHER PUBLICATIONS

International Search Report.

* cited by examiner

Primary Examiner—Sherry Estremsky
(74) Attorney, Agent, or Firm—Nixon Peabody, LLP

(57) ABSTRACT

Because a shift lever device 10 uses attracting force of a fixed iron core 150A, 216A of a magnet 150 or an electromagnet 216 in switching between a lock state and an unlock state at a shift lock mechanism 118 and a key interlock mechanism 200, the mechanisms can be made compact. When a shift lever 12 is changed from a "D" shift position to a "4" shift position and when the shift lever 12 is changed from a "2" shift position to an "L" shift position, a link 30 is rotated in a same direction. Thus, a sliding direction of a slider 38 which detects a rotational position of the link 30 is only one, and a placement size of a detecting member 48 can be made small and the device can be made compact. Because the shift lock unit 88 is equipped integrally with shift lock mechanism 118, and the link 30, the slider 38 and the detecting member 48 of a sensing mechanism, the shift lock unit 88 can be made compact.

25 Claims, 26 Drawing Sheets

US 6,852,065 B2

LOCK MECHANISM, SHIFT LEVER DEVICE, AND SHIFT LOCK UNIT

TECHNICAL FIELD OF THE INVENTION

The present invention relates to a lock mechanism applied to a shift lever device, a shift lever device, and a shift lock unit which forms the shift lever device.

BACKGROUND ART

Conventionally, the shift lock mechanism disclosed in Japanese Patent Application Laid-Open (JP-A) No. 9-28071, as shown in the drawings of that same publication (in particular, in FIG. 14 or FIG. 19), is equipped with a main body portion of an electromagnetic solenoid which can move together with a stopper plate, a plunger (movable iron core) which can move with respect to the main body portion of the electromagnetic solenoid, and a lock plate which is interlocked with a shift lever. The stopper plate and a cam member of the plunger move reciprocatingly while respectively achieving a balance with the spring force of a spring member, and the lock plate can be set in a lock position and an unlock position.

Further, a conventional key interlock mechanism is equipped with a member to be locked which can interlock with the rotation operation of an ignition key, and a lock member which operates so as to be able to be engaged with and removed from the member to be locked. With the plunger (the movable iron core) of the electromagnetic solenoid serving as a driving source, the lock member can be set in a key lock state in which the lock member makes switching of the ignition key from a key rotation operation position to a key insertion/removal possible position impossible, and a key unlock state in which the lock member makes switching of the ignition key from the key rotation operation position to the key insertion/removal possible position possible.

However, because the plunger (movable iron core) of the electromagnetic solenoid is used as the driving source of the aforementioned shift lock mechanism and key interlock mechanism, the mechanisms must be made large in accordance with the movable range of the plunger (the movable iron core), and electric power for moving the plunger (the movable iron core) is needed.

Moreover, for example, a shift lever device 60 shown in FIG. 27 is currently being developed, and this shift lever device 60 is equipped with a shift lever 62. Further, the shift lever device 60 is a so-called gate-type device. Due to the shift lever 62 being turned in the vehicle longitudinal direction or the vehicle left-right direction, the shift position (e.g., a "D" shift position, a "4" shift position, a "3" shift position, a "2" shift position, and an "L" shift position or the like) can be changed.

In particular, when the shift lever 62 is changed from the "D" shift position to the "4" shift position, the shift lever 62 must be turned toward the right of the vehicle. When the shift lever 62 is changed from the "4" shift position to the "3" shift position, the shift lever 62 must be turned toward the rear of the vehicle. When the shift lever 62 is changed from the "3" shift position to the "2" shift position, the shift lever 62 must be turned toward the left of the vehicle and toward the rear of the vehicle in that order. When the shift lever 62 is changed from the "2" shift position to the "L" shift position, the shift lever 62 must be turned toward the left of the vehicle.

Thus, the turning position, in the vehicle longitudinal direction, of the shift lever 62 differs between the "D" shift position and the "4" shift position, and the "3" shift position, and the "2" shift position and the "L" shift position. By detecting the turning position, in the vehicle longitudinal direction, of the shift lever 62, it can be detected which of the "D" shift position or the "4" shift position, and the "3" shift position, and the "2" shift position or the "L" shift position, the shift lever 62 is positioned at.

Further, the shift lever 60 is equipped with a plate 64. The plate 64 is supported further toward the rear of the vehicle than the shift lever 62 when the shift lever 62 is positioned at the "2" shift position, and is freely rotatable in a horizontal plane A first arm portion 66 is provided integrally with the vehicle front side of the plate 64. The plate 64 is rotated due to the first arm portion 66 being pushed by the shift lever 62 toward the right of the vehicle when the shift lever 62 is changed from the "D" shift position to the "4" shift position. Further, a second arm portion 68 is provided integrally with the vehicle front side of the plate 64. The plate 64 is rotated due to the second arm portion 68 being pushed by the shift lever 62 toward the left of the vehicle when the shift lever 62 is changed from the "2" shift position to the "L" shift position.

A slider 70 is held at the vehicle rear side of the plate 64. When the shift lever 62 is changed from the "D" shift position to the "4" shift position, due to the rotation of the plate 64, the slider 70 is slid toward the left of the vehicle, whereas when the shift lever 62 is changed from the "2" shift position to the "L" shift position, due to the rotation of the plate 64, the slider 70 is slid toward the right of the vehicle.

Four thin-plate-shaped contact plates 72 are mounted to the vehicle rear side portion of the slider 70. The four contact plates 72 are aligned in the vehicle vertical direction.

A plate-shaped detecting member 74 is disposed at the vehicle rear side of the slider 70. As shown in FIG. 28, a "D" terminal 76A, a "4" terminal 76B, a "D-4" terminal 76C, a "2-L" terminal 76D, an "L" terminal 76E, and a "2" terminal 76F, which are each formed in a thin-plate shape, are provided along the vehicle left-right direction at the slider 70 side side surface of the detecting member 74. The "D" terminal 76A is provided along the vehicle left-right direction center from the vehicle right side end portion of the detecting member 74. The "4" terminal 76B is provided at the vehicle left side end portion of the detecting member 74 at the vehicle left side of the "D" terminal 76A. The "D-4" terminal 76C is provided from the vehicle right side end portion of the detecting member 74 to the vehicle left side end portion, directly beneath the "D" terminal 76A and the "4" terminal 76B. The "2-L" terminal 76D is provided from the vehicle right side end portion of the detecting member 74 to the vehicle left side end portion, directly beneath the "D-4" terminal 76C. The "L" terminal 76E is provided at the vehicle right side end portion of the detecting member 74, directly beneath the "2L" terminal 76D. The "2" terminal 76F is provided from the vehicle left-right direction center of the detecting member 74 to the vehicle left side end portion, at the vehicle left side of the "L" terminal 76E.

Here, when the shift lever 62 is positioned at the "D" shift position and the "2" shift position, each contact plate 72 contacts the "D" terminal 76A, the "D-4" terminal 76C, the "2-L" terminal 76D, and the "2" terminal 76F, respectively.

When the shift lever 62 is changed from the "D" shift position to the "4" shift position, each contact plate 72 slides toward the left of the vehicle integrally with the sliding of the slider 70 toward the left of the vehicle, and contacts the "4" terminal 76B, the "D-4" terminal 76C, the "2-L" terminal 76D, and the "2" terminal 76F, respectively. In this way, it is detected which of the "D" shift position or the "2" shift position, and the "4" shift position the shift lever 62 is positioned at.

When the shift lever 62 is changed from the "2" shift position to the "L" shift position, each contact plate 72 slides toward the right of the vehicle integrally with the sliding of the slider 70 toward the right of the vehicle, and contacts the "D" terminal 76A, the "D-4" terminal 76C, the "2-L" terminal 76D, and the "L" terminal 76E, respectively. In this way, it is detected which of the "D" shift position or the "2" shift position, and the "L" shift position the shift lever 62 is positioned at.

In this way, at the shift lever device 60, it is detected which of the "D" shift position or the "4" shift position, and the "3" shift position, and the "2" shift position or the "L" shift position, the shift lever 62 is positioned at, and it is detected which of the "D" shift position or the "2" shift position, and the "4" shift position, and the "L" shift position, the shift lever 62 is positioned at. In this way, there is a structure in which it is detected which of the "D" shift position and the "4" shift position and the "3" shift position and the "2" shift position and the "L" shift position the shift lever 62 is positioned at.

However, in the shift lever device 60, when the shift lever 62 is changed from the "D" shift position to the "4" shift position and when the shift lever 62 is changed from the "2" shift position to the "L" shift position, the plate 64 rotates in mutually opposite directions, and the slider 70 slides in mutually opposite directions. Thus, the placement size (width X in FIG. 27), in the vehicle left-right direction, of the detecting member 74 which the contact plate 72 of the slider 70 contacts must be made large, and a problem arises in that the placement space of the detecting member 74 becomes large.

Further, in the shift lever device 60, the plate 64, the slider 70 (including the contact plate 72), and the detecting member 74 are provided separately from a shift lock mechanism (not shown) and the like, and a problem arises in that the mechanism becomes large.

DISCLOSURE OF THE INVENTION

In view of the aforementioned, an object of the present invention is to provide a lock mechanism, a shift lever device, and a shift lock unit which can aim for compactness.

The lock mechanism recited in claim 1 is a lock mechanism applied to a shift lever device and having a function by which an operation member cannot be operated to a predetermined position, comprising: an interlocking member which can interlock with operation of the operation member, and a lock member which is engageable with and releasable from the interlocking member, wherein, in accordance with attracting force of a fixed iron core of an electromagnet, the lock member can assume a lock state in which the lock member makes operation of the operation member to the predetermined position impossible, and an unlock state in which the lock member makes operation of the operation member to the predetermined position possible.

In accordance with the lock mechanism recited in claim 1, the attracting force of the fixed iron core of the electromagnet is used in switching between the lock state and the unlock state. Thus, as compared with a conventional case using a plunger (movable iron core) of an electromagnetic solenoid, rising and falling of the iron core can be eliminated, and the mechanism can be made compact. Further, movement of the iron core can be suppressed, and the amount of electric power can be reduced.

The lock mechanism recited in claim 2 is, in the lock mechanism recited in claim 1, a shift lock mechanism in which the operation member is a shift lever, the predetermined position is a position other than a specific position of the shift lever, and the interlocking member is a portion to be locked which can interlock with operation of the shift lever, and the shift lock mechanism has a function by which the shift lever cannot be operated from the specific position to a position other than the specific position.

The lock mechanism recited in claim 2 is a shift lock mechanism having a function by which the shift lever cannot be operated from a specific position to a position other than the specific position. In this shift lock mechanism, the effects that rising and falling of the iron core can be eliminated and the mechanism can be made compact, and movement of the iron core can be suppressed and the amount of electric power can be reduced, can be obtained.

In the lock mechanism recited in claim 3, in the lock mechanism recited in claim 1 or 2, in the lock state, attracting force of the fixed iron core of the electromagnet is cancelled and the lock member anchors with the interlocking member, and in the unlock state, the attracting force of the fixed iron core of the electromagnet is generated and anchoring of the lock member with respect to the interlocking member can be cancelled.

In the lock mechanism recited in claim 3, the electromagnet is un-energized in the lock state in which the brake is not depressed. Thus, the amount of electric power can be reduced even more.

In the lock mechanism recited in claim 4, in the lock mechanism recited in claim 3, the lock member includes an anchor member having an anchor surface which, in the lock state, abuts an anchor surface provided at the interlocking member, and a releasing member which has an anchor releasing surface which can abut an anchor releasing surface provided at the interlocking member, the electromagnet moves together with one of the anchor member and the releasing member, and the electromagnet and the one of the anchor member and the releasing member are movable relative to another of the anchor member and the releasing member, and the other of the anchor member and the releasing member has a attraction surface which is attracted to the fixed iron core of the electromagnet in the unlock state, and the releasing member assumes an engageable state in which the releasing member can engage with the anchor releasing surface of the interlocking member at the anchor releasing surface of the releasing member, and accompanying this engagement, the releasing member can set the anchor member in a lock state in a state in which attraction from the electromagnet is cancelled, and can set the anchor member in an unlock state in a state of being attracted to the electromagnet.

In the lock mechanism recited in claim 4, due to the anchor member and the releasing member which form the lock member, switching between the lock state and the unlock state can be carried out smoothly by utilizing the attracting force of the fixed iron core of the electromagnet.

The lock mechanism recited in claim 5 is, in the lock mechanism recited in claim 1, a key interlock mechanism in which the operation member is an ignition key, the predetermined position is a key insertion/removal possible position of the ignition key, and the interlocking member is a member to be locked which can interlock with respect to rotation operation of the ignition key, and the key interlock mechanism has a function by which the ignition key cannot be switched from a key rotation operation position to the key insertion/removal possible position in a state in which the shift lever is operated to a position other than a park position.

The lock mechanism recited in claim 5 is a key interlock mechanism which has a function by which the ignition key cannot be switched from a key rotation operation position to a key insertion/removal possible position in a state in which the shift lever is operated to a position other than a park position. In this key interlock mechanism, the effects that rising and falling of the iron core can be eliminated and the mechanism can be made compact, and movement of the iron core can be suppressed and the amount of electric power can be reduced, can be obtained.

In the lock mechanism recited in claim 6, in the lock mechanism recited in claim 1 or 5, in the lock state, the lock member is attracted by the electromagnet and anchors the interlocking member, and in the unlock state, attraction from the electromagnet is cancelled and anchoring of the lock member with respect to the interlocking member can be cancelled.

In the lock mechanism recited in claim 6, in the unlock state in which the ignition key can be pulled out, the electromagnet is un-energized. Thus, the amount of electric power can be reduced even more.

In the lock mechanism recited in claim 7, in the lock mechanism recited in claim 6, the lock member has at least a releasing member of among an anchor member having an anchor surface which, in the lock state, abuts an anchor surface provided at the interlocking member, and the releasing member which has an anchor releasing surface which can abut an anchor releasing surface provided at the interlocking member, at least the releasing member of among the anchor member and the releasing member of the lock member can move with respect to the electromagnet, and one of the anchor member and the releasing member which can move with respect to the electromagnet has a attraction surface which is attracted to the fixed iron core of the electromagnet in the lock state, at least the releasing member of among the anchor member and the releasing member of the lock member can, in the lock state, move with respect to the attraction surface attracted to the fixed iron core of the electromagnet, and at least one of the anchor member and the releasing member, which can move with respect to the attraction surface, can move together with the electromagnet, and the releasing member can assume an engageable state in which the releasing member can engage with the anchor releasing surface of the interlocking member at the anchor releasing surface of the releasing member, and accompanying this engagement, at least one of the anchor member and the releasing member can assume the lock state and the unlock state.

In the lock mechanism recited in claim 7, due to the anchor member and the releasing member which form the lock member, switching between the lock state and the unlock state can be carried out smoothly by utilizing the attracting force of the fixed iron core of the electromagnet.

In the lock mechanism recited in claim 8, in the lock mechanism recited in claim 4 or 7, at least one of the anchor member and the releasing member of the lock member moves in a direction of attracting force of the fixed iron core of the electromagnet which works on the attraction surface, and at least one of an anchor surface of the anchor member and an anchor releasing surface of the releasing member intersects a direction of a locus of movement of at least one of the anchor surface and the anchor releasing surface of the interlocking member and moves in a direction of the attracting force.

In the lock mechanism recited in claim 8, the lock member can be brought together compactly, and the mechanism can be made compact.

In the lock mechanism recited in claim 9, in the lock mechanism recited in claim 4 or 8, the lock member includes a spring which urges the anchor member to return to the lock state from the unlock state.

In the lock mechanism recited in claim 9, due to the spring which urges the anchor member to return to the lock state from the unlock state, the switching between the lock state and the unlock state can be carried out even more smoothly by utilizing the attracting force of the fixed iron core of the electromagnet.

In the lock mechanism recited in claim 10, in the lock mechanism recited in claim 7 or 8, the anchor member and the releasing member of the lock member are movable relative to one another, and the lock member is equipped with a spring which urges the anchor member to return to the unlock state form the lock state.

In the lock mechanism recited in claim 10, due to the spring which urges the anchor member to return to the unlock state from the lock state, the switching between the lock state and the unlock state can be carried out even more smoothly by utilizing the attracting force of the fixed iron core of the electromagnet.

In the lock mechanism recited in claim 11, in the lock mechanism recited in any one of claims 4 and 7 through 10, the lock member is equipped with a spring which urges the releasing member to return to the engageable state.

In the lock mechanism recited in claim 11, due to the spring which urges the releasing member to return to the engageable state, the switching between the lock state and the unlock state can be carried out even more smoothly by utilizing the attracting force of the fixed iron core of the electromagnet.

In the lock mechanism recited in claim 12, in the lock mechanism recited in any one of claims 1 through 11, the lock mechanism comprises a yoke which is provided so as to be freely inclinable in correspondence with the electromagnet, and which adheres to the electromagnet due to magnetic force when the electromagnet generates the magnetic force.

In the lock mechanism recited in claim 12, the yoke is provided so as to be freely inclinable. Thus, even in a case in which the electromagnet is inclined with respect to the yoke when the yoke adheres to the electromagnet due to dispersion in the dimensions at the electromagnet or the yoke or the like or dispersion in the assembly thereof or the like arising, a gap can be prevented from opening between the yoke and the electromagnet due to the yoke inclining in correspondence with the inclination of the electromagnet. Thus, a deterioration in the close fit between the yoke and the electromagnet is prevented, and the adhesive force of the yoke and the electromagnet can be prevented from deteriorating.

In the lock mechanism recited in claim 13, in the lock mechanism recited in claim 12, the lock mechanism comprises a holding claw which is provided so as to project in an L-shape in cross-section toward the electromagnet side, and which makes the yoke freely inclinable by supporting an end portion of the yoke.

In the lock mechanism recited in claim 13, the yoke is made to be freely inclinable due to the holding claw projecting in an L-shape in cross-section toward the electromagnet side and supporting an end portion of the yoke.

Thus, with a simple structure, the yoke can be provided so as to be freely inclinable.

In the lock mechanism recited in claim 14, in the lock mechanism recited in claim 12 or 13, the lock mechanism comprises a cushion which is elastic and pushes the yoke toward the electromagnet side.

In the lock mechanism recited in claim 14, the cushion is elastic and pushes the yoke toward the electromagnet side. Thus, clattering of the yoke can be suppressed, and the abutment noise of the yoke and the electromagnet when the yoke adheres to the electromagnet can be prevented from resonating.

The shift lever device recited in claim 15 comprises: a shift lever provided so as to be turnable in a predetermined direction and toward both sides of the predetermined direction, and due to a turning position in the predetermined direction being changed, a first shift position and a second shift position are changed, and by being turned toward one side of the predetermined direction from the first shift position, the shift lever is changed to a third shift position, and by being turned toward another side of the predetermined direction from the second shift position, the shift lever is changed to a fourth shift position; a link provided so as to be rotatable in correspondence with the shift lever, the link being rotated in a same specific direction by the shift lever when the shift lever is changed from the first shift position to the third shift position and when the shift lever is changed from the second shift position to the fourth shift position; a first detecting portion connected to the shift lever, and detecting the turning position, in the predetermined direction, of the shift lever; and a second detecting portion connected to the link, and detecting a rotational position of the link.

In the shift lever device recited in claim 15, by changing the turning position, in the predetermined direction, of the shift lever, the first shift position and the second shift position of the shift lever are changed.

Further, the shift lever is changed to the third shift position by being turned toward one side of the predetermined direction from the first shift position. At this time, the link is rotated in the specific direction by the shift lever. On the other hand, the shift lever is changed to the fourth shift position by being turned toward the other side of the predetermined direction from the second shift position. At this time as well, the link is rotated in the specific direction by the shift lever.

Moreover, the turning position, in the predetermined direction, of the shift lever is detected by the first detecting portion. In this way, in a case in which, for example, the turning position, in the predetermined direction, of the shift lever is the same at the first shift position and the third shift position and is the same at the second shift position and the fourth shift position, it can be detected which of the first shift position or the third shift position, and the second shift position or the fourth shift position, the shift lever is positioned at.

Further, the rotational position of the link is detected by the second detecting portion. In this way, it can be detected which of the first shift position or the second shift position, and the third shift position or the fourth shift position, the shift lever is positioned at.

Accordingly, it can be detected, by the first detecting portion and the second detecting portion, which of the first shift position and the second shift position and the third shift position and the fourth shift position, the shift lever is positioned at.

Here, the link is rotated in the same specific direction when the shift lever is changed from the first shift position to the third shift position and when the shift lever is changed from the second shift position to the fourth shift position. Thus, the placement size of the second detecting portion, which detects the rotational position of the link, can be made small. It is possible to make the placement space of the second detecting portion compact, and therefore, to make the device compact.

In the shift lever device recited in claim 16, in the shift lever device recited in claim 15, a rotation central axis of the link is disposed between the first shift position and the second shift position of the shift lever, and the link is rotatable substantially parallel to a plane of turning, in the predetermined direction, of the shift lever, and the link has a first arm corresponding to the third shift position of the shift lever and a second arm corresponding to the fourth shift position of the shift lever, and when the shift lever is changed from the first shift position to the third shift position, the shift lever displaces the first arm toward one of a distal end side and a proximal end side of the shift lever and rotates the link in the specific direction, whereas when the shift lever is changed from the second shift position to the fourth shift position, the shift lever displaces the second arm toward another of the distal end side and the proximal end side of the shift lever and rotates the link in the specific direction.

In the shift lever device recited in claim 16, the rotation central axis of the link is disposed between the first shift position and the second shift position of the shift lever, and the link is rotatable substantially parallel to a plane of turning, in the predetermined direction, of the shift lever.

Further, when the shift lever is changed from the first shift position to the third shift position, the link is rotated in the specific direction due to the shift lever displacing the first arm of the link toward one of a distal end side and a proximal end side of the shift lever.

On the other hand, when the shift lever is changed from the second shift position to the fourth shift position, the link is rotated in the specific direction due to the shift lever displacing the second arm of the link toward the other of the distal end side and the proximal end side of the shift lever.

Thus, a structure in which the link is always rotated in the same specific direction can be realized easily.

In the shift lever device recited in claim 17, in the shift lever device recited in claim 15 or 16, the first detecting portion transmits, to the second detecting portion, a signal regarding a detected turning position, in the predetermined direction, of the shift lever, and the second detecting portion switches a transmission direction of the received signal on the basis of a detected rotational position of the link.

In the shift lever device recited in claim 17, the first detecting portion transmits, to the second detecting portion, a signal regarding a detected turning position, in the predetermined direction, of the shift lever. The second detecting portion switches the transmission direction of the received signal on the basis of the detected rotational position of the link. Thus, the shift position detecting mechanism of the shift lever can be structured simply as compared with a case in which the signal regarding the turning position, in the predetermined direction, of the shift lever which is detected by the first detecting portion, and the signal regarding the rotational position of the link detected by the second detecting portion, are transmitted in a state of being multiplexed.

A shift lock unit recited in claim 18 is a shift lock unit forming a shift lever device which is equipped with: a shift lever provided so as to be turnable in a predetermined direction and toward both sides of the predetermined direction, and due to a turning position in the predetermined direction being changed, a first-shift position and a second shift position are changed, and by being turned toward one side of the predetermined direction from the first shift position, the shift lever is changed to a third shift position, and by being turned toward another side of the predetermined direction from the second shift position, the shift lever is changed to a fourth shift position; and a first detecting portion connected to the shift lever, and detecting the turning position, in the predetermined direction, of the shift lever, wherein the shift lock unit integrally comprises: a shift lock mechanism having a function by which the shift lever cannot be operated from a specific position to a position other than the specific position; and a sensing mechanism which senses a change from the first shift position of the shift lever to the third shift position, and a change from the second shift position of the shift lever to the fourth shift position.

In the shift lock unit recited in claim 18, the shift lock mechanism has a function by which the shift lever cannot be operated from a specific position to a position other than the specific position. Further, the sensing mechanism senses a change from the first shift position of the shift lever to the third shift position, and a change from the second shift position of the shift lever to the fourth shift position.

Here, the shift lock unit is integrally equipped with the shift lock mechanism and the sensing mechanism. Thus, compactness can be aimed for as compared with a case in which the shift lock mechanism and the sensing mechanism are provided separately.

In the shift lock unit recited in claim 19, in the shift lock unit recited in claim 18, the sensing mechanism includes: a link provided so as to be rotatable in correspondence with the shift lever, the link being rotated in a same specific direction by the shift lever when the shift lever is changed from the first shift position to the third shift position and when the shift lever is changed from the second shift position to the fourth shift position; and a second detecting portion connected to the link, and detecting a rotational position of the link.

In the shift lock unit recited in claim 19, the turning position, in the predetermined direction, of the shift lever is detected by the first detecting portion. In this way, in a case in which, for example, the turning position, in the predetermined direction, of the shift lever is the same at the first shift position and the third shift position and is the same at the second shift position and the fourth shift position, it can be detected which of the first shift position or the third shift position, and the second shift position or the fourth shift position, the shift lever is positioned at.

Further, the rotational position of the link is detected by the second detecting portion. In this way, it can be detected which of the first shift position or the second shift position, and the third shift position or the fourth shift position, the shift lever is positioned at.

Accordingly, it can be detected, by the first detecting portion and the second detecting portion, which of the first shift position and the second shift position and the third shift position and the fourth shift position, the shift lever is positioned at.

Here, the link is rotated in the same specific direction when the shift lever is changed from the first shift position to the third shift position and when the shift lever is changed from the second shift position to the fourth shift position.

Thus, the placement size of the second detecting portion, which detects the rotational position of the link, can be made small. It is possible to make the placement space of the second detecting portion compact, and accordingly, to make the device more compact.

In the shift lock unit recited in claim 20, in the shift lock unit recited in claim 19, the shift lock unit comprises a guide portion which is provided in correspondence with the link, and which guides rotation, in the specific direction, of the link.

The shift lock unit recited in claim 20 comprises the guide portion which guides rotation, in the specific direction, of the link. Thus, the rotation of the link can be prevented from moving in the rotation orthogonal direction.

In the shift lock unit recited in claim 21, in the shift lock unit recited in claim 19 or 20, the shift lock unit comprises: a restoring member provided at the link, and applying torque in a direction opposite the specific direction to the link and restoring the link to an initial rotational position; and an elastic member which is elastic and which the link, which is restored to the initial rotational position, abuts.

In the shift lock unit recited in claim 21, when the link is rotated in the specific direction by the shift lever, the restoring member applies torque in the direction opposite the specific direction to the link, and restores the link to the initial rotational position. Further, the link, which is restored to the initial rotational position, abuts the elastic member which is elastic. Thus, the generation of an abutment noise when the link is restored to the initial rotational position can be prevented.

In the shift lock unit recited in claim 22, in the shift lock unit recited in any one of claims 18 through 21, the shift lock unit comprises a shift position detecting portion which detects that the shift lever is positioned at a specific shift position.

In the shift lock unit recited in claim 22, the shift position detecting portion, which detects that the shift lever is positioned at the specific shift position, is provided. Thus, more compactness can be aimed for, as compared with a case in which the shift position detecting portion is provided separately from the shift lock unit.

BEST MODES FOR IMPLEMENTING THE INVENTION

A lock mechanism, a shift lever device, and a shift lock unit of the present invention will be described in detail on the basis of the appended drawings.

First, a shift lever device 10 relating to a first embodiment will be described on the basis of FIG. 1 through FIG. 21.

Figure 1:
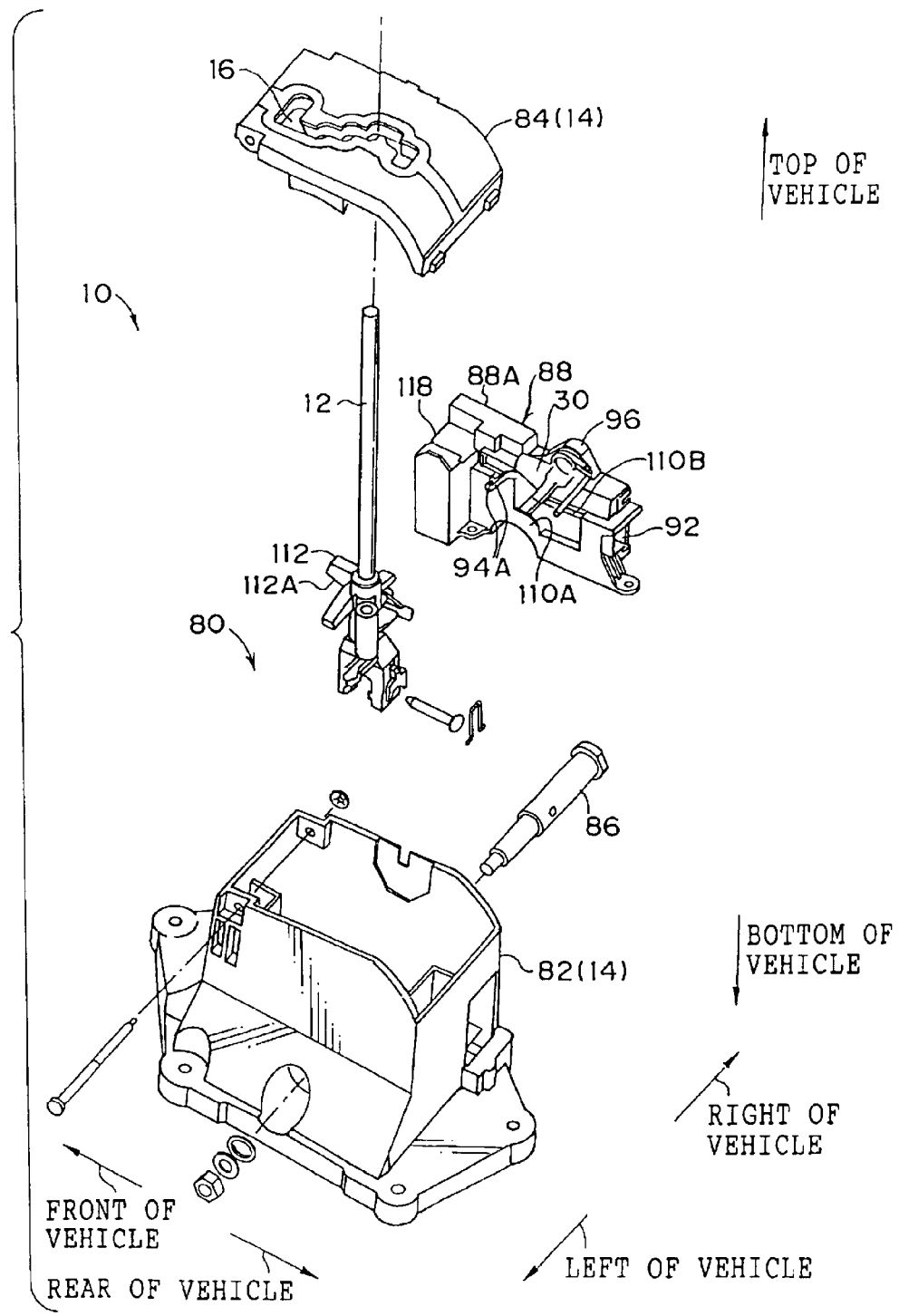
FIG. 1 is an exploded perspective view showing a shift lever device relating to a first embodiment.

As shown in FIG. 1, the shift lever device 10 relating to the present embodiment is a so-called gate-type device, and is set on a floor surface within a vehicle.

This shift lever device 10 is equipped with a box-shaped cover 14 which forms a shift operation portion 80. The cover 14 is fixed to the floor surface within the vehicle. The cover 14 is structured by a box-shaped base plate 82 whose top surface is open, and a plate-shaped cover member 84. The cover member 84 is fixed to the top surface of the base plate 82.

A substantially solid cylindrical rotating shaft 86, which forms the shift operating portion 80, is provided at the lower portion within the base plate 82. The rotating shaft 86 is parallel to the vehicle left-right direction, and rotates freely around the central axis. The proximal end of a shift lever 12, which serves as an operation member and forms the shift operation portion 80, is supported at the rotating shaft 86. The shift lever 12 freely rotates in the vehicle left-right direction with respect to the rotating shaft 86. Thus, the shift lever 12 can turn in the vehicle longitudinal direction (a predetermined direction) and the vehicle left-right direction (both sides of the predetermined direction). Further, the shift lever 12 is connected to the automatic transmission (not illustrated) of the vehicle.

Figure 18:
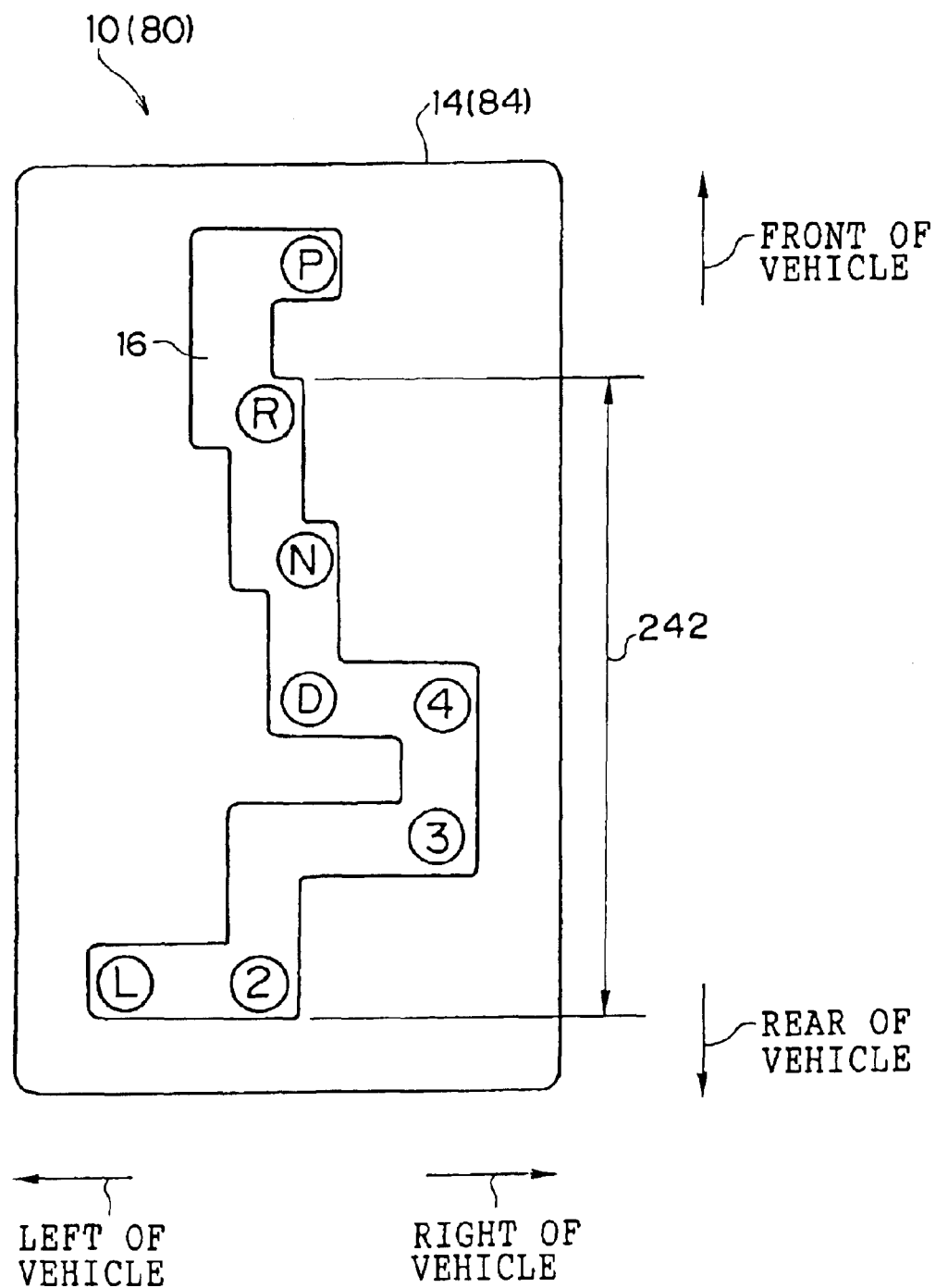
FIG. 18 is a plan view schematically showing a cover in the shift lever device relating to the first embodiment.

As shown in FIG. 18 as well, a guide hole 16 is formed in the cover member 84. The guide hole 16 has a predetermined curved configuration. The shift lever 12 is inserted through the guide hole 16. Due to the shift lever 12 being guided by the guide hole 16 and being turned in the vehicle longitudinal direction or the vehicle left-right direction, the shift position (in the present embodiment, a "P" shift position serving as a predetermined position and a predetermined shift position, an "R" shift position, an "N" shift position, a "D" shift position serving as a first shift position, a "4" shift position serving as a third shift position, a "3" shift position, a "2" shift position serving as a second shift position, and an "L" shift position serving as a fourth shift position) is changed.

Namely, when the shift lever 12 is changed from the "P" shift position to the "R" shift position, the shift lever 12 must be turned toward the left of the vehicle, toward the rear of the vehicle, and toward the right of the vehicle in that order. When the shift lever 12 is changed from the "R" shift position to the "N" shift position, the shift lever 12 must be turned toward the rear of the vehicle and toward the right of the vehicle in that order. When the shift lever 12 is changed from the "N" shift position to the "D" shift position, the shift lever 12 must be turned toward the rear of the vehicle. When the shift lever 12 is changed from the "D" shift position to the "4" shift position, the shift lever 12 must be turned toward the right of the vehicle (one side in the predetermined direction). When the shift lever 12 is changed from the "4" shift position to the "3" shift position, the shift lever 12 must be turned toward the rear of the vehicle. When the shift lever 12 is changed from the "3" shift position to the "2" shift position, the shift lever 12 must be turned toward the left of the vehicle and toward the rear of the vehicle in that order. When the shift lever 12 is changed from the "2" shift position to the "L" shift position, the shift lever 12 must be turned toward the left of the vehicle (the other side in the predetermined direction).

Thus, the turning position, in the vehicle longitudinal direction of the shift lever 12 is different at the "P" shift position, and the "R" shift position, and the "N" shift position, and the "D" shift position and the "4" shift position, and the "3" shift position, and the "2" shift position and the "L" shift position.

Figure 8:
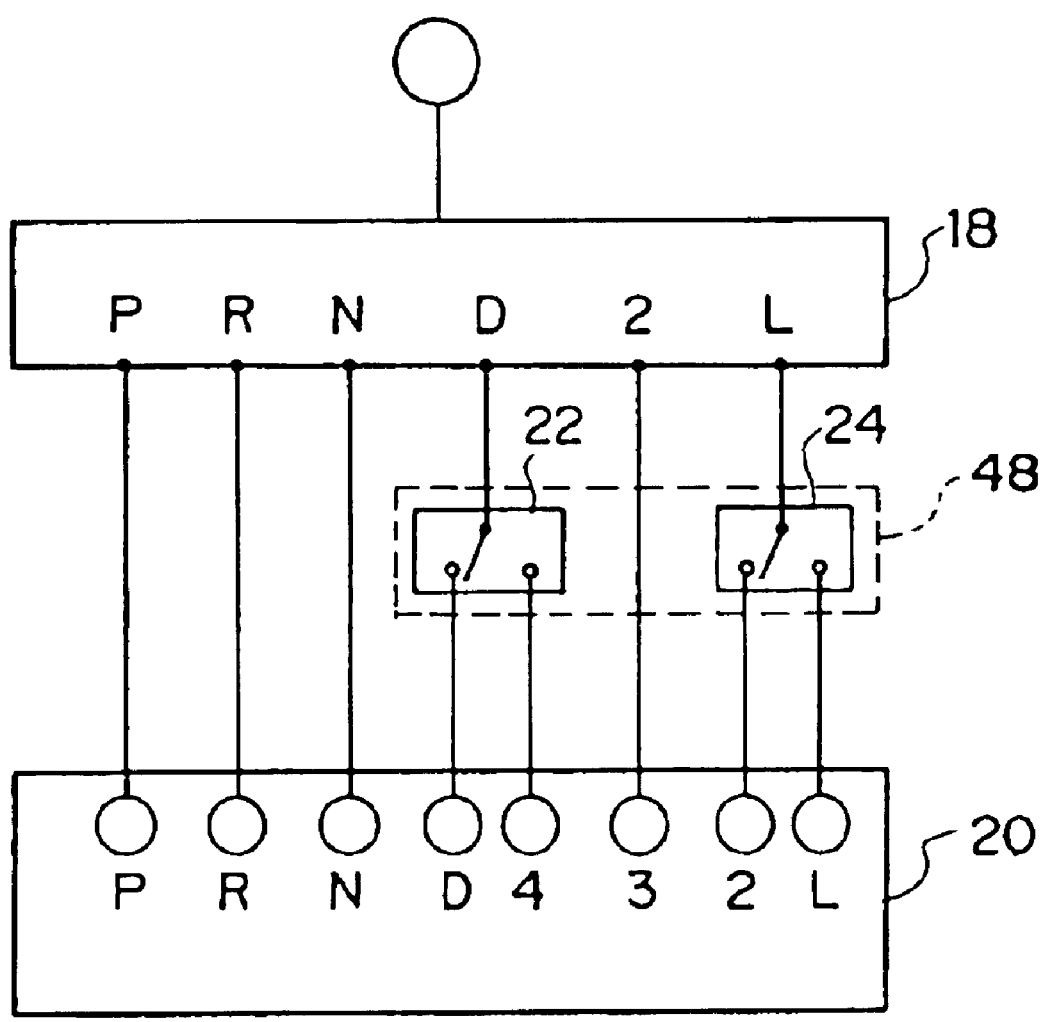
FIG. 8 is a circuit diagram showing a connected state of an NSS, a meter, a "D-4" switch, and a "2-L" switch of the shift lever device relating to the first embodiment.

The shift lever 12 is connected to a so-called NSS (neutral start switch) 18 which serves as a first detecting portion shown in FIG. 8. The NSS 18 detects the turning position, in the vehicle longitudinal direction, of the shift lever 12. In this way, it can be detected which of the "P" shift position, and the "R" shift position, and the "N" shift position, and the "D" shift position or the "4" shift position, and the "3" shift position, and the "2" shift position or the "L" shift position, the shift lever 12 is positioned at.

A "P" terminal, an "R" terminal, an "N" terminal, a "D" terminal, a "2" terminal, and an "L" terminal are provided at the NSS 18. When the shift lever 12 is positioned at the "P" shift position, a signal is transmitted from the "P" terminal. When the shift lever 12 is positioned at the "R" shift position, a signal is transmitted from the "R" terminal. When the shift lever 12 is positioned at the "N" shift position, a signal is transmitted from the "N" terminal. When the shift lever 12 is positioned at the "D" shift position or the "4" shift position, a signal is transmitted from the "D" terminal. When the shift lever 12 is positioned at the "3" shift position, a signal is transmitted from the "2" terminal. When the shift lever 12 is positioned at the "2" shift position or the "L" shift position, a signal is transmitted from the "L" terminal.

The NSS 18 is directly connected to a meter 20. A "P" lamp, an "R" lamp, an "N" lamp, a "D" lamp, a "4" lamp, a "3" lamp, a "2" lamp, and an "L" lamp are provided at the meter 20.

The "P" lamp, the "R" lamp, the "N" lamp, and the "3" lamp of the meter 20 are connected to the "P" terminal, the "R" terminal, the "N" terminal, and the "2" terminal of the NSS 18, respectively. When a signal is transmitted from the "P" terminal, the "R" terminal, the "N" terminal, or the "2" terminal, the "P" lamp, the "R" lamp, the "N" lamp, or the "3" lamp, respectively, is lit.

The "D" lamp and the "4" lamp of the meter 20 and the "D" terminal of the NSS 18 are connected in a state in which a "D-4" switch 22 is interposed therebetween. The "D-4" switch 22 can switch the transmission direction of the signal from the "D" terminal between the "D" lamp side and the "4" lamp side.

The "2" lamp and the "L" lamp of the meter 20 and the "L" terminal of the NSS 18 are connected in a state in which a "2-L" switch 24 is interposed therebetween. The "2-L" switch 24 can switch the transmission direction of the signal from the "L" terminal between the "2" lamp side and the "L" lamp side.

Figure 5:
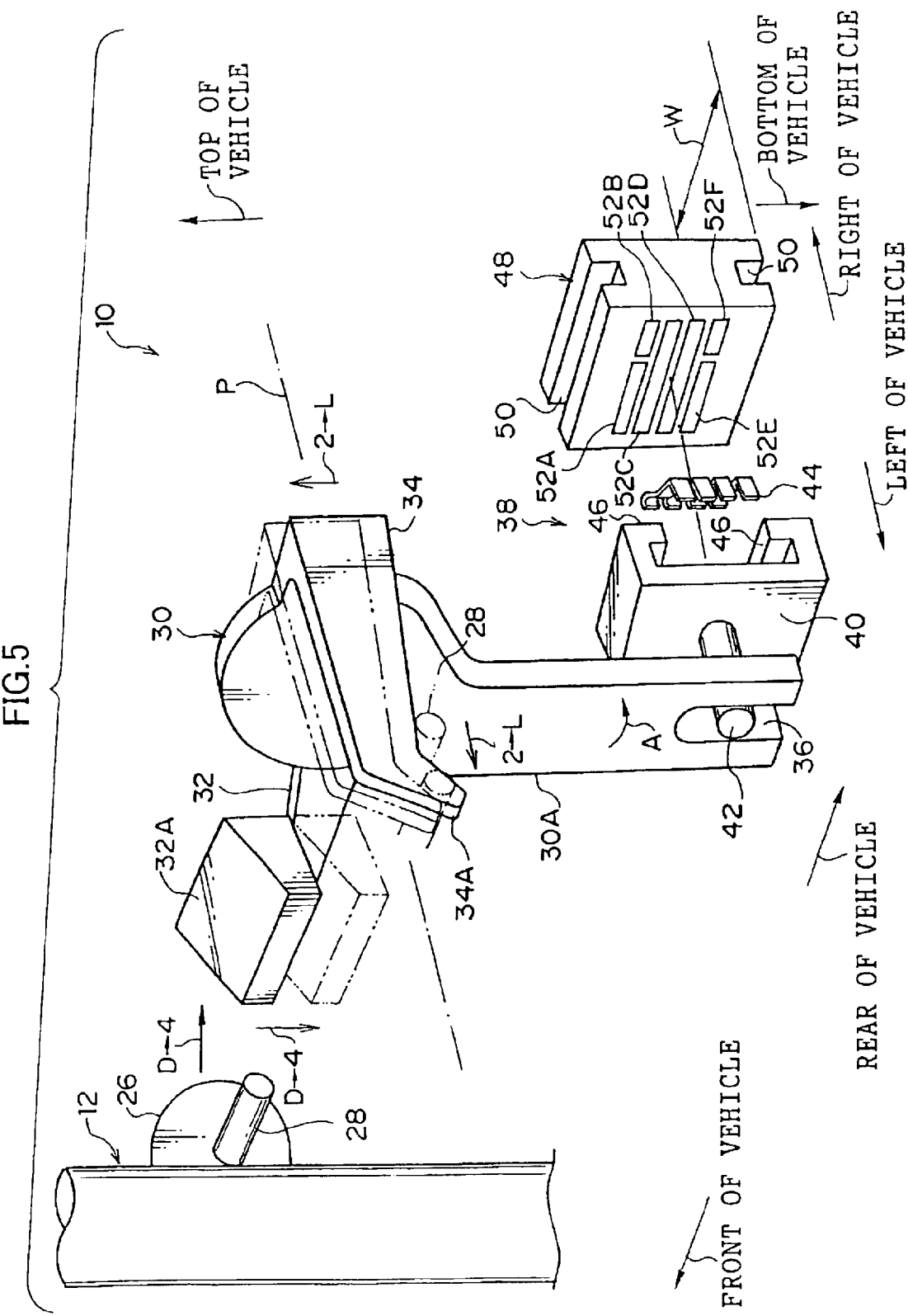
FIG. 5 is a perspective view schematically showing a sensing mechanism of the shift lever device relating to the first embodiment.

As shown in FIG. 5, a semicircular switching plate 26 is provided integrally at the proximal end side of the shift lever 12. The switching plate 26 projects toward the right of the vehicle from the shift lever 12. A solid cylindrical switching rod 28 is provided integrally with the switching plate 26. The switching rod 28 projects from the switching plate 26 toward the rear of the vehicle.

Figure 3:
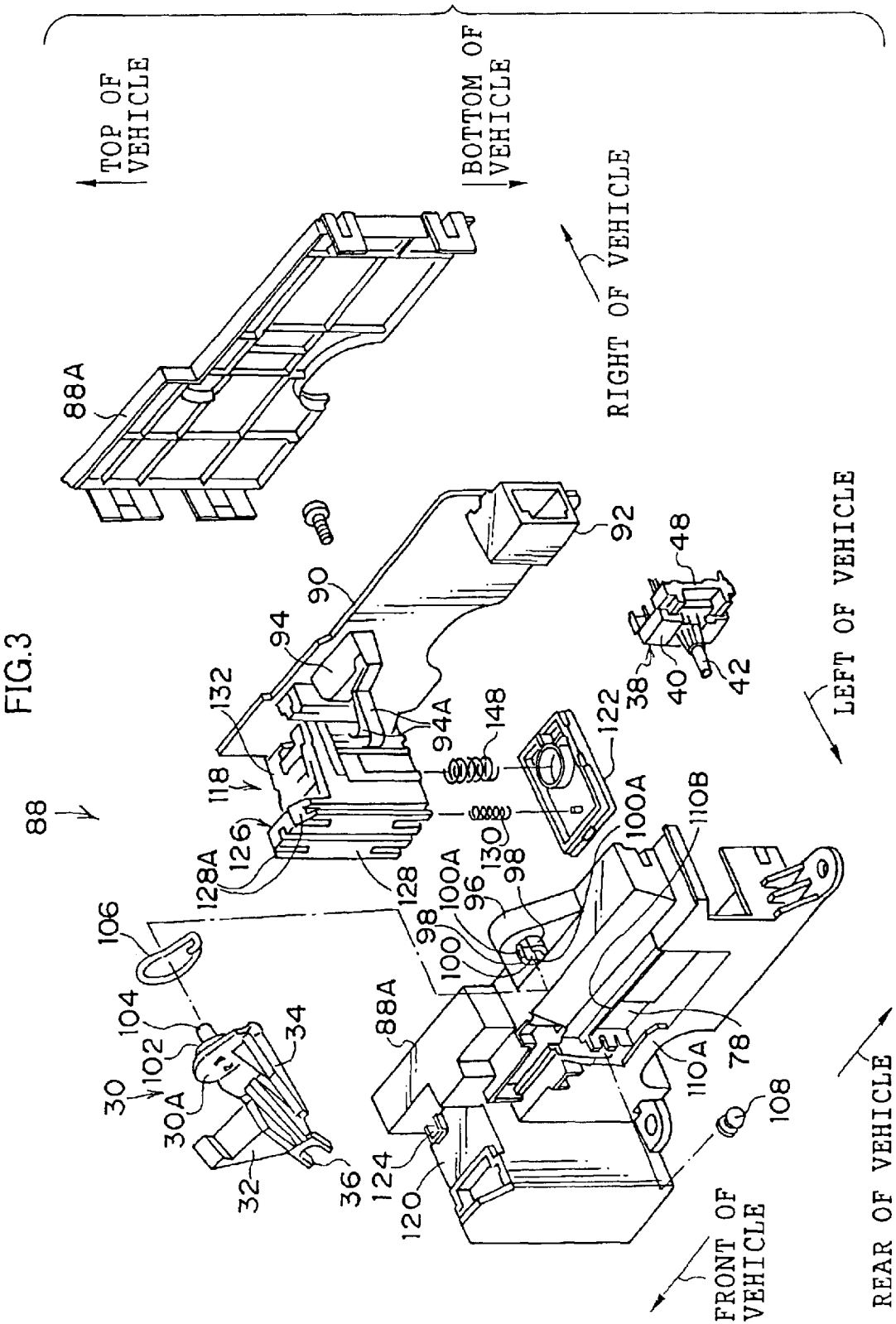
FIG. 3 is an exploded perspective view showing the shift lock unit of the shift lever device relating to the first embodiment.

As shown in FIG. 1, a shift lock unit 88 is provided within the base plate 82 at the vehicle right side of the shift lever 12. The shift lock unit 88 is equipped with a box-shaped housing 88A. As shown in FIG. 3, a circuit substrate 90 is fixed within the housing 88A. A connector 92 is provided at the vehicle rear side end portion of the circuit substrate 90. Further, a shift position detecting portion 94 is removably provided at a vehicle front side region of the circuit substrate 90. The shift position detecting portion 94 is connected to the connector 92 via the circuit substrate 90. The shift position detecting portion 94 has a pair of thin-plate-shaped contact plates 94A which are elastic. The pair of contact plates 94A do not contact one another. The pair of contact plates 94A project from the vehicle left side side surface of the housing 88A. When the shift lever 12 is positioned at the "P" shift position, the shift lever 12 pushes one contact plate 94A toward the front of the vehicle such that the pair of contact plates 94A contact one another. In this way, it can be detected by the shift position detecting portion 94 that the shift lever 12 is positioned at the "P" shift position.

Figure 2:
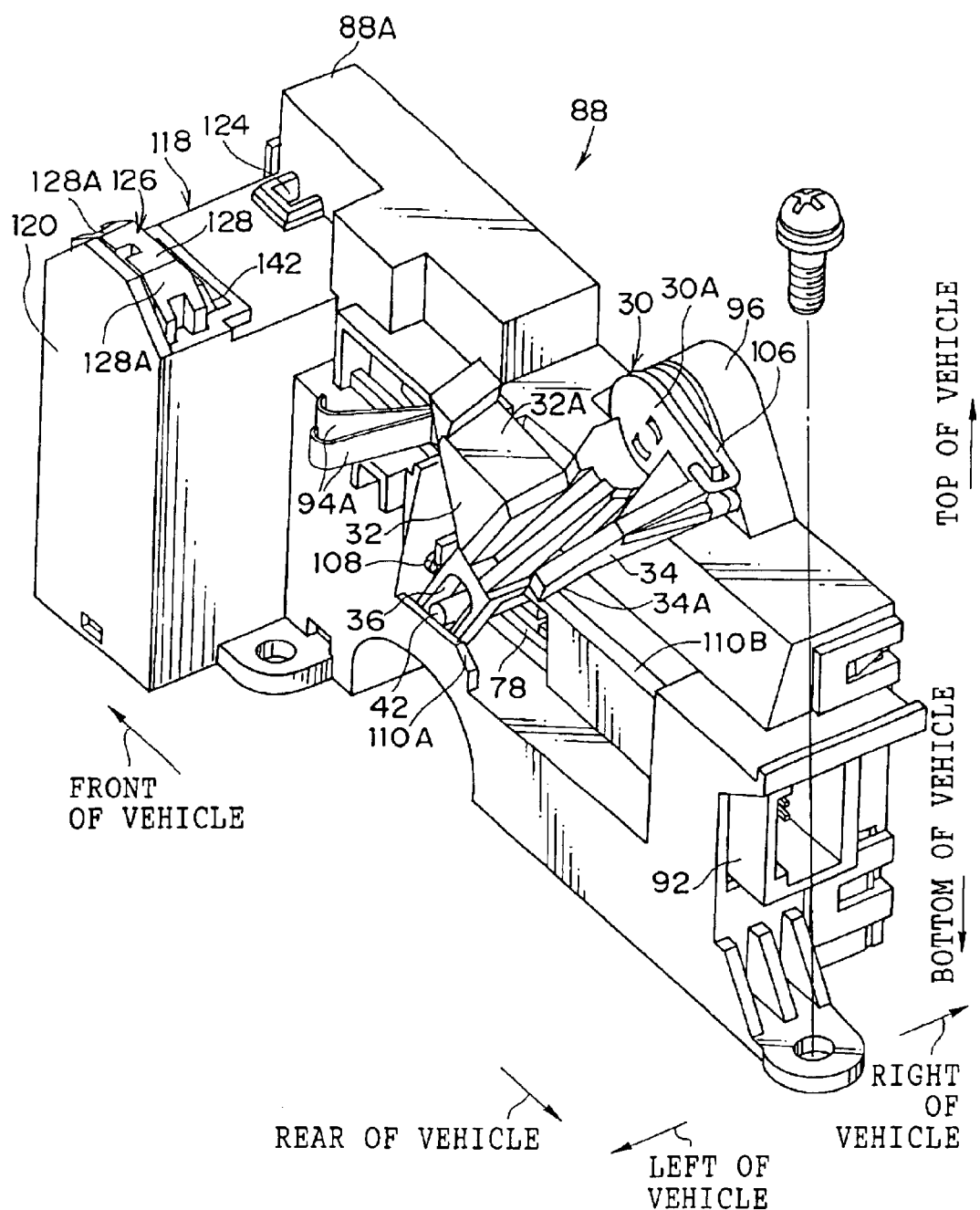
FIG. 2 is a perspective view showing a shift lock unit of the shift lever device relating to the first embodiment.

As shown in FIG. 2, a triangular-plate-shaped projecting portion 96 is provided erect at the top surface of the housing 88A. A substantially solid cylindrical supporting shaft 98 is provided at the vehicle left side (shift lever 12 side) side surface of the projecting portion 96. A through-hole 100, which has a circular cross-sectional configuration and passes through the projecting portion 96 as well, is formed in the center of the supporting shaft 98. Insertion holes 100A, which have rectangular cross-sectional configurations and pass through the projecting portion 96 as well, are formed so as to oppose each other respectively at the diagonally upper portion and the diagonally lower portion of the through hole 100.

A link 30, which forms a sensing mechanism, is assembled with the supporting shaft 98. The link 30 is set at the vehicle right side of the shift lever 12 in correspondence with the switching plate 26 and the switching rod 28 of the shift lever 12.

The link 30 is provided with a long-plate-shaped link main body 30A. As shown in detail in FIG. 4, a fit-together concave portion 102 projects in a tubular form at the supporting shaft 98 side side wall of the upper portion of the link main body 30A. A penetrating shaft 104, which is shaped as a solid cylinder, projects at the center of the fit-together concave portion 102. A pair of anchor projections 104A, which have rectangular cross-sectional configurations, are provided so as to oppose one another at the distal end of the penetrating shaft 104.

Here, after the respective anchor projections 104A have been inserted into the respective insertion holes 100A and the penetrating shaft 104 has been made to penetrate through and fit together with the through hole 100, by rotating the bottom portion of the link main body 30A toward the front of the vehicle, the respective anchor projections 104A are anchored on the projecting portion 96 of the peripheries of the through holes 100 and the bottom surface of the fit-together concave portion 102 abuts the side surface of the supporting shaft 98, in a state in which the peripheral surface of the supporting shaft 98 is fit together with the inner peripheral surface of the fit-together concave portion 102. In this way, the link main body 30A (the link 30) is supported by the supporting shaft 98, and is rotatable parallel to a perpendicular plane along the vehicle longitudinal direction (the plane of turning in the predetermined direction of the shift lever 12), with the central line of the supporting shaft 98 (the one-dot chain line in FIG. 5 disposed between the "D" shift position and the "2" shift position of the shift lever 12) being a rotation central axis P. Further, as will be described later, in the range in which the link 30 rotates due to turning of the shift lever 12, the rotational positions of the respective anchor projections 104A are structured so as to not coincide with the respective insertion holes 100A. In this way, canceling of the supporting of the link 30 by the supporting shaft 98 can be impeded. Moreover, the projecting portion 96, the supporting shaft 98, the through-hole 100, the fit-together concave portion 102, the penetrating shaft 104, and the anchor projections 104A function as a guide portion. The rotation of the link 30 is guided by the fitting-together of the penetrating shaft 104 into the through-hole 100, the fitting-together of the supporting shaft 98 peripheral surface with the fit-together concave portion 102 inner peripheral surface, the anchoring of the anchor projections 104A on the projecting portion 96, and the abutting of the fit-together concave portion 102 bottom surface with the supporting shaft 98 side surface.

A torsion coil spring 106 serving as a restoring member spans between the link main body 30A and the projecting portion 96. In this way, the link main body 30A (the link 30) is urged in the opposite direction of arrow A in FIG. 5. An elastic member 108, which is made of rubber and is elastic, is removably provided at the vehicle left side side surface of the housing 88A in correspondence with the lower portion of the link main body 30A. The elastic member 108 projects in a triangular pyramid shape toward the lower portion of the link main body 30A (the vehicle rear side). The lower portion of the link main body 30A, which is urged by the torsion coil spring 106, abuts the elastic member 108. The link main body 30A (the link 30) is thereby made to substantially stand and is positioned at the initial rotational position.

A guide wall 110A and a guide projecting portion 110B, which form the guide portion, are formed at the vehicle left side side surface of the housing 88A in correspondence with the lower portion of the link main body 30A. The guide wall 110A and the guide projecting portion 110B oppose one another in a state in which the guide wall 110A is disposed at the left side of the vehicle and the guide projecting portion 110B is disposed at the right side of the vehicle. Here, as will be described later, in the range in which the link 30 rotates due to the turning of the shift lever 12, the lower portion of the link main body 30A is inserted between the guide wall 110A and the guide projecting portion 110B in a state of abutting both, and the rotation of the link 30 is guided by the guide wall 110A and the guide projecting portion 110B.

As shown in detail in FIG. 5, a first arm 32 is provided integrally with the upper portion of the link main body 30A, in correspondence with the "4" shift position of the shift lever 12. The first arm 32 extends toward the front of the vehicle from the link main body 30A. A plate-shaped receiving portion 32A is provided integrally with the distal end of the first arm 32. The top surface of the receiving portion 32A is inclined toward the bottom of the vehicle toward the left of the vehicle. Here, when the shift lever 12 is changed from the "D" shift position to the "4" shift position and the switching plate 26 is moved toward the right of the vehicle, the top surface of the receiving portion 32A is pushed by the switching plate 26, and the first arm 32 is displaced toward the bottom of the vehicle (the proximal end side of the shift lever 12). In this way, the link 30 is rotated in the direction of arrow A in FIG. 5 (the specific direction).

A second arm 34 is provided integrally with the upper portion of the link main body 30A in correspondence with the "L" shift position of the shift lever 12. The second arm 34 projects in an L-shape from the link main body 30A, and the distal end side extends toward the left of the vehicle. The distal end of the second arm 34 is bent such that a bent portion 34A is formed. The bottom surface of the bent portion 34A is inclined toward the bottom of the vehicle toward the left of the vehicle. Here, when the shift lever 12 is changed from the "2" shift position to the "L" shift position and the switching rod 28 is moved toward the left of the vehicle, the bottom surface of the bent portion 34A is pushed by the switching rod 28 and the second arm 34 is displaced toward the top of the vehicle (the distal end side of the shift lever 12). In this way, the link 30 is rotated in the direction of arrow A in FIG. 5.

A cut-out portion 36 is formed in the bottom portion of the link main body 30A. The cut-out portion 36 is parallel to the vehicle vertical direction, and the bottom end is open.

A slider 38, which forms a second detecting portion of the sensing mechanism, is disposed at the vehicle right side of the link 30. The slider 38 is accommodated within the housing 88A. The slider 38 is equipped with a rectangular-plate-shaped slider main body 40. A solid cylindrical fit-in rod 42 is provided integrally with the vehicle left side side surface of the slider main body 40. An insert-through hole 78 is formed directly beneath the aforementioned guide projecting portion 110B in the vehicle left side side surface of the housing 88A, in correspondence with the fit-in rod 42. The insert-through hole 78 is elongated along the vehicle longitudinal direction. The fit-in rod 42 is inserted through the insert-through hole 78 and is slidably fit-in into the cut-out portion 36 of the link main body 30A. In this way, the slider 38 slides in the vehicle longitudinal direction as the link 30 rotates.

Figure 6:
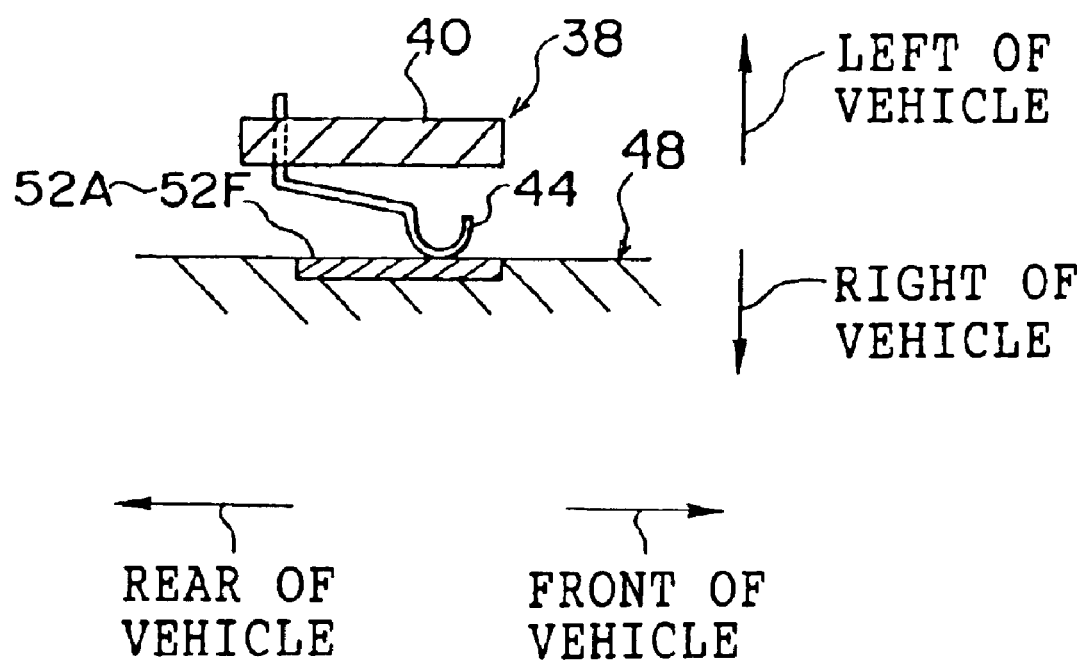
FIG. 6 is a cross-sectional view showing a state in which a contact plate of a slider contacts a terminal of a detecting member in the shift lever device relating to the first embodiment.
Figure 7:
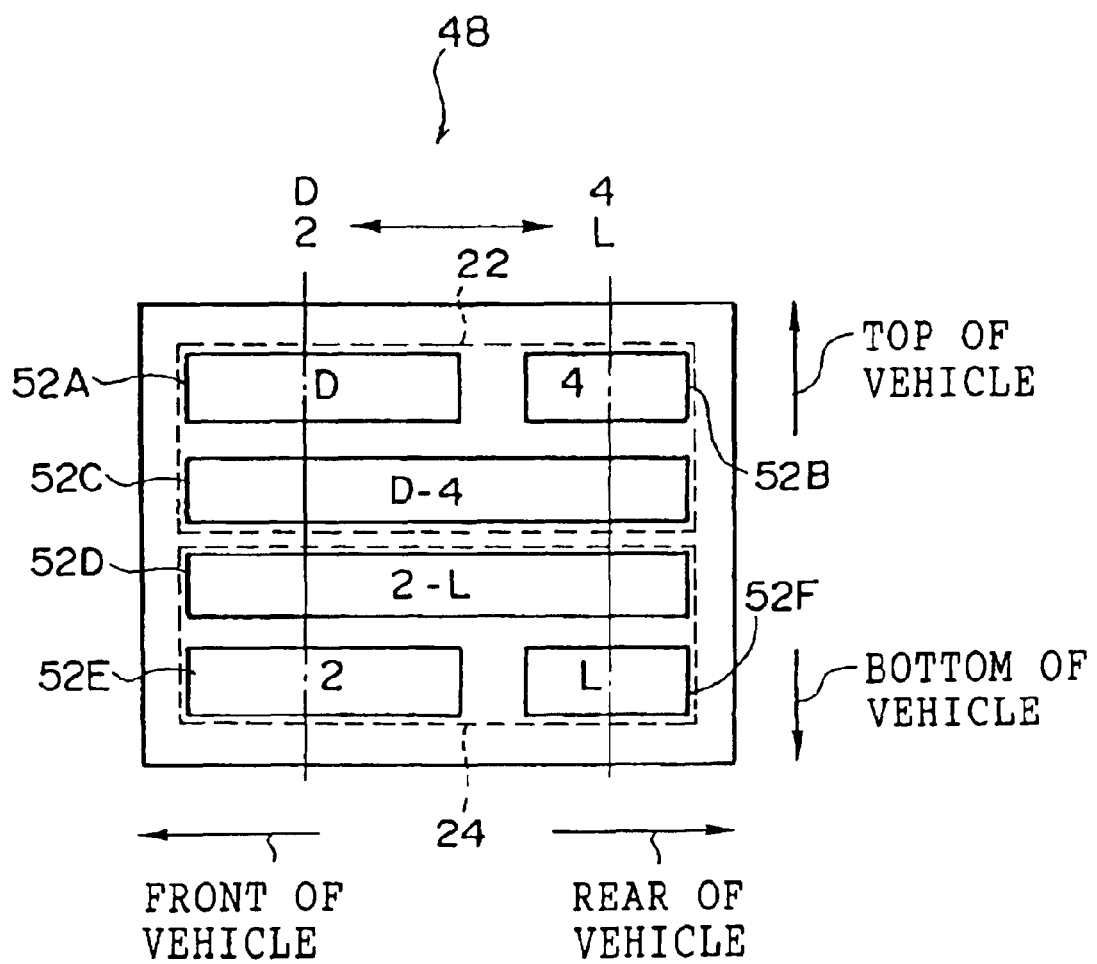
FIG. 7 is a front view showing the terminals of the detecting member in the shift lever device relating to the first embodiment.

A predetermined number (4 in the present embodiment) of thin-plate-shaped contact plates 44 are mounted to the vehicle right side side surface of the slider main body 40. The predetermined number of contact plates 44 are aligned in the vehicle vertical direction. As shown in FIG. 6, the distal end of each connect plate 44 contacts the vehicle left side side surface of a detecting member 48 which will be described later.

A guiding projection 46 is provided integrally at each of the upper end and the lower end of the slider main body 40. Both guiding projections 46 project in L-shapes toward the right of the vehicle from the slider main body 40, and oppose one another.

The rectangular-plate shaped detecting member 48, which forms the second detecting portion of the sensing mechanism, is set at the vehicle right side of the slider 38. The detecting member 48 is fixed to the aforementioned circuit substrate 90 and is accommodated within the housing 88A. A guiding concave portion 50 is formed in each of the upper end and the lower end of the detecting member 48. The sliding of the slider 38 in the vehicle longitudinal direction is guided by the respective guiding projections 46 of the slider 38 being fit into the respective guiding concave portions 50.

A "D" terminal 52A, a "4" terminal 52B, a "D-4" terminal 52C, a "2-L" terminal 52D, a "2" terminal 52E, and an "L" terminal 52F, which are each formed in a thin-plate-shape, are provided along the vehicle longitudinal direction at the vehicle left side side surface of the detecting member 48, and are respectively connected to the aforementioned connector 92 via the circuit substrate 90. As shown in detail in FIG. 7, the "D" terminal 52A is provided from the vehicle front side end portion of the detecting member 48 to the vehicle longitudinal direction center. The "4" terminal 52B is provided at the vehicle rear side of the "D" terminal 52A at the vehicle rear side end portion of the detecting member 48. The "D-4" terminal 52C is provided from the vehicle front side end portion of the detecting member 48 to the vehicle rear side end portion, directly beneath the "D" terminal 52A and the "4" terminal 52B. The "2-L" terminal 52D is provided from the vehicle front side end portion of the detecting member 48 to the vehicle rear side end portion, directly beneath the "D-4" terminal 52C. The "2" terminal 52E is provided from the vehicle front side end portion of the detecting member 48 to the vehicle longitudinal direction center, directly beneath the "2-L" terminal 52D. The "L" terminal 52F is provided at the vehicle rear side end portion of the detecting member 48 at the vehicle rear side of the "2" terminal 52E.

Here, when the shift lever 12 is positioned at the "D" shift position and the "2" shift position, the distal ends of the respective contact plates 44 contact the "D" terminal 52A, the "D-4" terminal 52C, the "2-L" terminal 52D, and the "2" terminal 52E, respectively.

When the shift lever 12 is changed from the "D" shift position to the "4" shift position and when the shift lever 12 is changed from the "2" shift position to the "L" shift position, the respective contact plates 44 are slid toward the rear of the vehicle integrally with the sliding of the slider 38 toward the rear of the vehicle which accompanies rotation of the link 30 in the direction of arrow A in FIG. 5, and the respective contact plates 44 contact the "4" terminal 52B, the "D-4" terminal 52C, the "2-L" terminal 52D, and the "L" terminal 52F, respectively.

In this way, it can be detected which of the "D" shift position or the "2" shift position, and the "4" shift position or the "L" shift position, the shift lever 12 is positioned at.

The "D" terminal 52A, the "4" terminal 52B and the "D-4" terminal 52C of the detecting member 48 correspond to the aforementioned "D-4" switch 22 shown in FIG. 8, whereas the "2-L" terminal 52D, the "2" terminal 52E and the "L" terminal 52F of the detecting member 48 correspond to the aforementioned "2-L" switch 24 shown in FIG. 8.

Here, when the shift lever 12 is positioned at the "D" shift position or the "2" shift position, due to the distal ends of the respective contact plates 44 contacting the "D" terminal 52A, the "D-4" terminal 52C, the "2-L" terminal 52D and the "2" terminal 52E of the detecting member 48 respectively, at the "D-4" switch 22, the transmission direction of the signal from the "D" terminal of the NSS 18 is made to be to the "D" lamp side of the meter 20, and at the "2-L" switch 24, the transmission direction of the signal from the "L" terminal of the NSS 18 is made to be the "2" lamp side of the meter 20. Thus, by a signal being transmitted from the "D" terminal or the "L" terminal, the "D" lamp or the "2" lamp, respectively, is lit.

Further, when the shift lever 12 is positioned at the "4" shift position or the "L" shift position, due to the distal ends of the respective contact plates 44 contacting the "4" terminal 52B, the "D-4" terminal 52C, the "2-L" terminal 52D and the "L" terminal 52F of the detecting member 48 respectively, at the "D-4" switch 22, the transmission direction of the signal from the "D" terminal of the NSS 18 is switched to the "4" lamp side of the meter 20, and at the "2-L" switch 24, the transmission direction of the signal from the "L" terminal of the NSS 18 is switched to the "L" lamp side of the meter 20. Thus, by a signal being transmitted from the "D" terminal or the "L" terminal, the "4" lamp or the "L" lamp, respectively, is lit.

Moreover, as shown in FIG. 1, a substantially solid cylindrical lever 112, which serves as an interlocking member and a portion to be locked, is provided integrally at the proximal end side of the shift lever 12. The lever 112 projects toward the front of the vehicle from the shift lever 12. The cross-section of the lever 112 is a configuration which projects at an incline toward the bottom left of the vehicle. The bottom surface of the lever 112 is planar. The lever 112 interlocks with the turning operation of the shift lever 12. A vehicle bottom left region of the lever 112 is an abutment surface 112A which is used as both an anchor surface and an anchor releasing surface.

The shift lock unit 88 is equipped with a shift lock mechanism 118 (the same meaning as shift lock solenoid), which serves as a lock mechanism, at a vehicle front side region in correspondence with the position of the lever 112 when the shift lever 12 is disposed at the "P" shift position.

Figure 9:
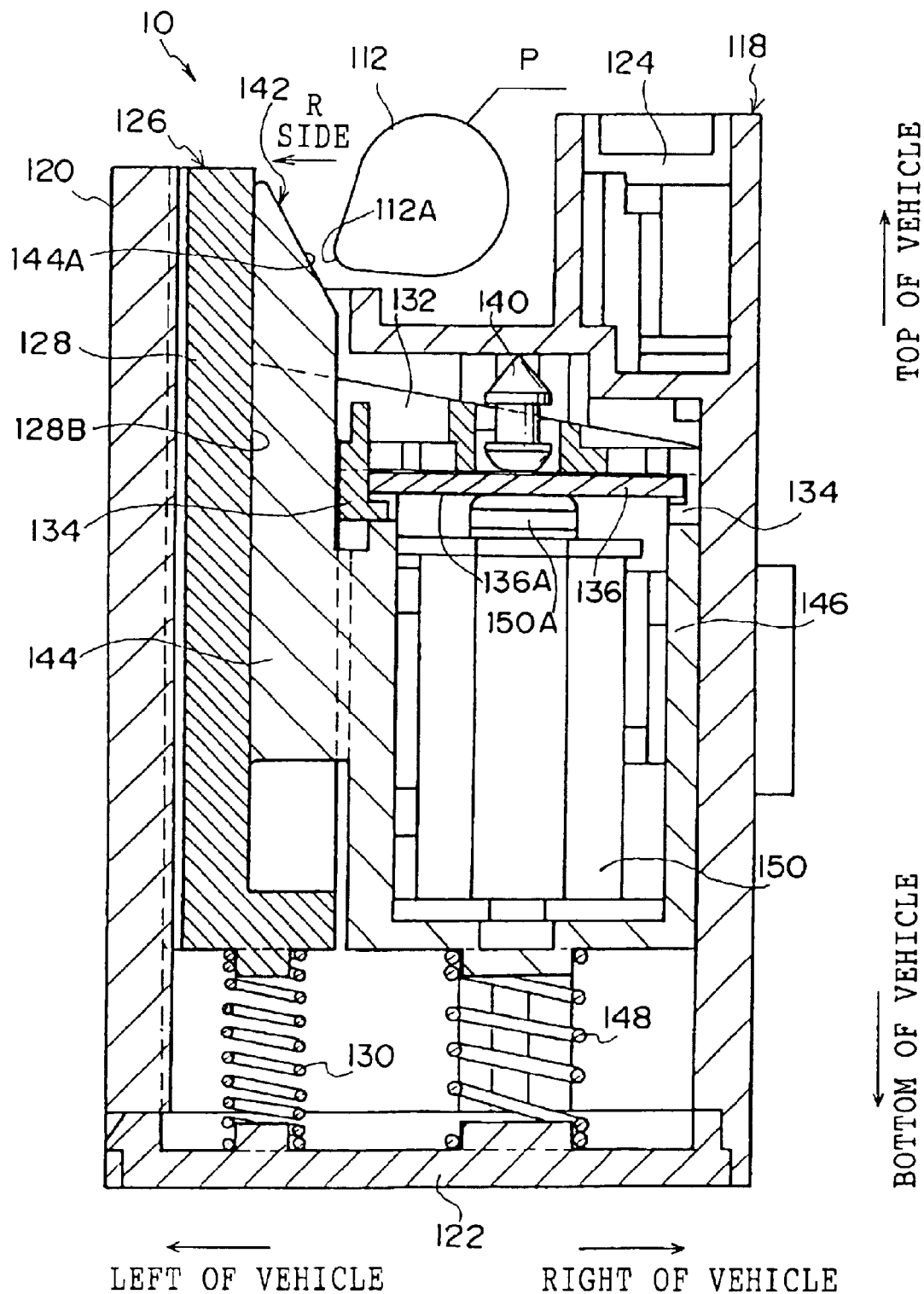
FIG. 9 is a cross-sectional view showing a shift lock mechanism of the shift lever device relating to the first embodiment.
Figure 13:
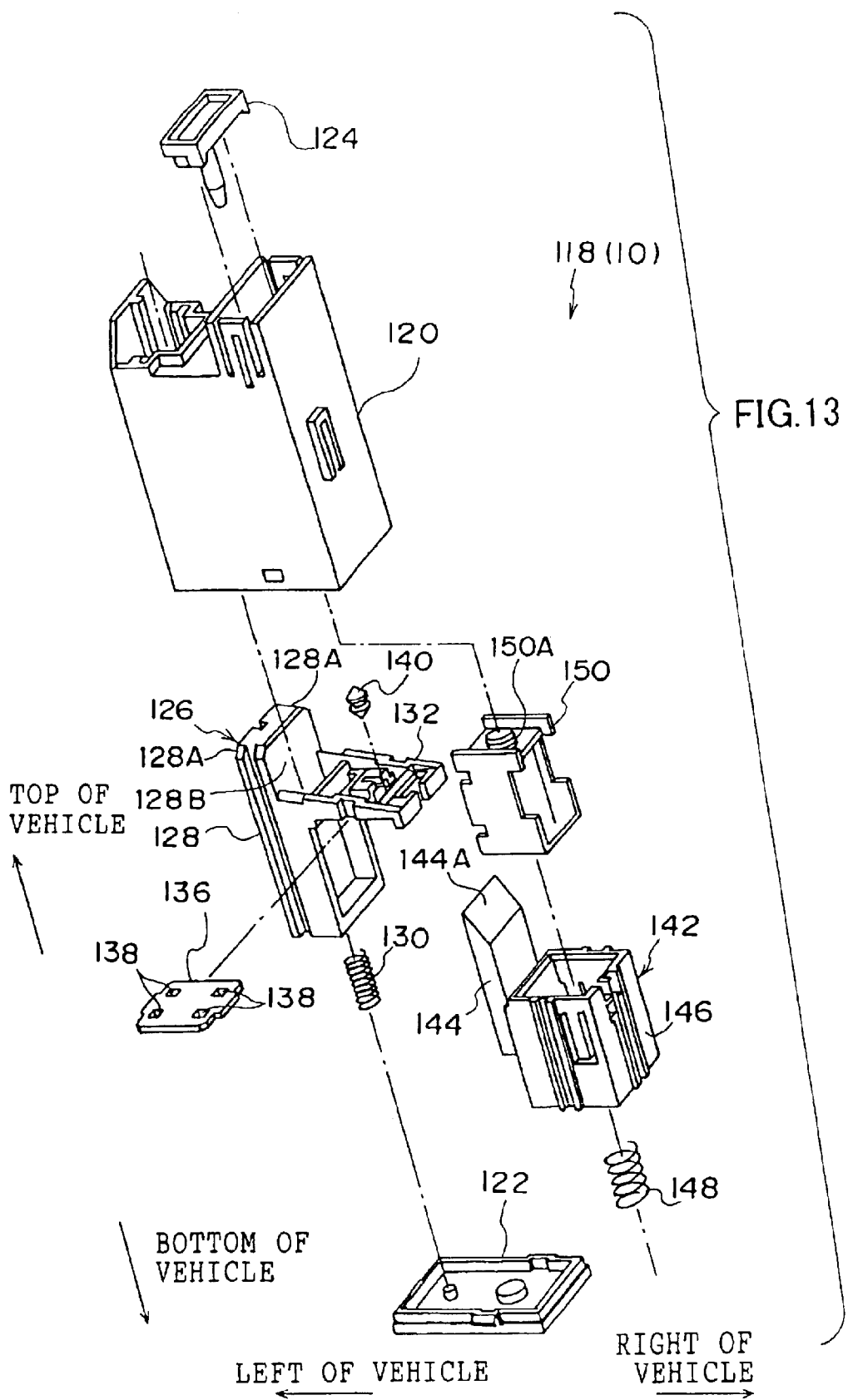
FIG. 13 is an exploded perspective view showing the shift lock mechanism of the shift lever device relating to the first embodiment.

As shown in detail in FIG. 9 and FIG. 13, the shift lock mechanism 118 is equipped with a substantially box-shaped case 120 whose bottom surface is open. The bottom surface of the case 120 is closed by a plate-shaped cap 122. The case 120 and the cap 122 form a portion of the aforementioned housing 88A. A releasing link 124 is fixed to the top surface of the case 120. Further, when the shift lever 12 is disposed at the "P" shift position, the lever 112 is disposed at the upper portion of the case 120.

A stopper 126 serving as an anchor member of a lock member is provided within the case 120. The stopper 126 has a plate-shaped vertical wall 128. The vertical wall 128 is disposed vertically, and inclined surfaces 128A are formed at both vehicle longitudinal direction end portions of the upper portion. The vertical wall 128 projects from the top surface of the case 120, and is disposed at the vehicle left side of the lever 112 when the shift lever 12 is disposed in the "P" shift position. The vehicle right side side surface of the vertical wall 128 is an anchor surface 128B. The stopper 126 (the vertical wall 128) is movable in the vehicle vertical direction, and is urged toward the top of the vehicle by a compression coil spring 130 (spring) which spans between the stopper 126 and the cap 122. In this way, the stopper 126 is disposed at a lock position (an upper side position).

The stopper 126 has a substantially plate-shaped horizontal wall 132. The horizontal wall 132 is disposed horizontally and is integral with the vertical wall 128. A pair of holding claws 134 are provided at the bottom surface of the horizontal wall 132. The pair of holding claws 134 respectively project in L-shapes in cross-section toward the vehicle bottom side (the side of a magnet 150 which will be described later), and oppose one another. Further, a predetermined number of anchor claws (not illustrated) are provided at the bottom surface of the horizontal wall 132. The respective anchor claws project toward the bottom of the vehicle.

A rectangular-plate-shaped yoke 136 is slide-inserted between the pair of holding claws 134. Each holding claw 134 supports an end portion of the yoke 136. In this way, the yoke 136 is provided at the stopper 126 in a state in which the bottom surface (absorption surface 136A) of the yoke 136 is open. The thickness of the yoke 136 is smaller than the gap between the bottom surface of the horizontal wall 132 and the distal ends of the respective holding claws 134. In this way, the yoke 136 is freely inclinable with respect to the stopper 126.

A predetermined number (four in the present embodiment) of anchor holes 138 are formed in the yoke 136. Due to the aforementioned anchor claws being inserted into the anchor holes 138, the yoke 136 is impeded from falling out from the stopper 126.

A cushion 140 is attached to the horizontal wall 132. The cushion 140 is formed from rubber and is elastic. At the cushion 140, conical regions are provided at the top end and the bottom end, and the both conical regions are connected by a central solid cylindrical region. The conical region at the bottom end of the cushion 140 abuts the center of the yoke 136. The cushion 140 thereby presses the yoke 136 toward the bottom of the vehicle (the side of the magnet 150 which will be described later).

A slider 142, which serves as a releasing member of the lock member, is provided within the case 120. The slider 142 has a plate-shaped slide wall 144. The slide wall 144 is disposed vertically. The slide wall 144 is inserted through the proximal end of the horizontal wall 132 of the stopper 126, and abuts the vertical wall 128 of the stopper 126. Further, the top surface of the slide wall 144 is formed to be an anchor releasing surface 144A and is inclined toward the bottom right of the vehicle. Moreover, the top portion of the slide wall 144 projects from the top surface of the case 120, and is disposed at the vehicle left side of the lever 112 when the shift lever 12 is disposed at the "P" shift position.

A box-shaped fixing portion 146, whose top surface is open, is provided integrally with the bottom portion of the slide wall 144. The fixing portion 146 is disposed beneath the yoke 136. The slider 142 (the fixing portion 146) is movable in vertical directions, and is urged upward by a compression coil spring 148 (spring), which-spans between the slider 142 and the cap 122, so as to be set in an engageable state C.

The magnet 150 serving as an electromagnet is fixed within the fixing portion 146. The magnet 150 always moves integrally with the slider 142, and is disposed beneath the yoke 136. The magnet 150 is connected to the brake (not shown) via the aforementioned circuit substrate 90 and connector 92. Due to the brake being operated, the brake brakes the vehicle. Further, when the brake is operated at the time when the shift lever 12 is turned from the "P" shift position to the "R" shift position side, a fixed iron core 150A of the magnet 150 generates magnetic force and can adhere to (attract) the yoke 136.

Here, when the shift lever 12 is turned from the "P" shift position to the "R" shift position side (when the shift lever 12 is turned toward the left of the vehicle), the lever 112 abuts the top surface of the slide wall 144 and pushes the slide wall 144 downward. The slider 142 and the magnet 150 are thereby moved downward.

Figure 10:
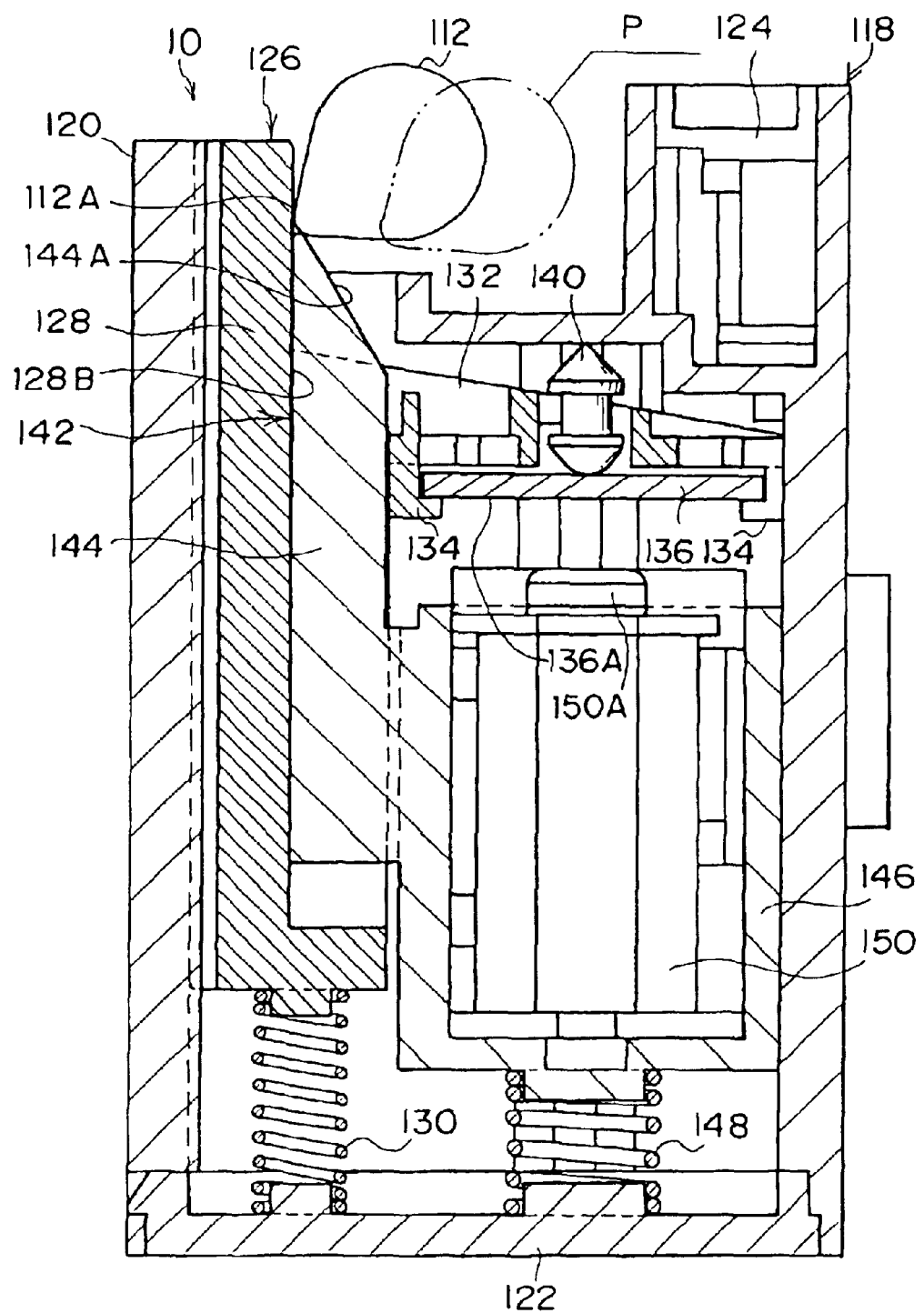
FIG. 10 is a cross-sectional view showing a state in which a slider and a magnet are moved downward and a stopper is disposed at a lock position, in the shift lock mechanism of the shift lever device relating to the first embodiment.

Further, if the brake is not operated at this time, as shown in FIG. 10, the magnet 150 does not generate magnetic force, and the yoke 136 does not adhere to the magnet 150. Thus, the stopper 126 is disposed at the lock position without moving downward (lever lock state A). In this way, movement of the lever 112 is impeded by the vertical wall 128 of the stopper 126, the shift lever 12 cannot be turned sufficiently toward the left of the vehicle and the shift lever 12 is unable to be turned toward the rear of the vehicle, and changing from the "P" shift position of the shift lever 12 to the "R" shift position is impeded.

Figure 11:
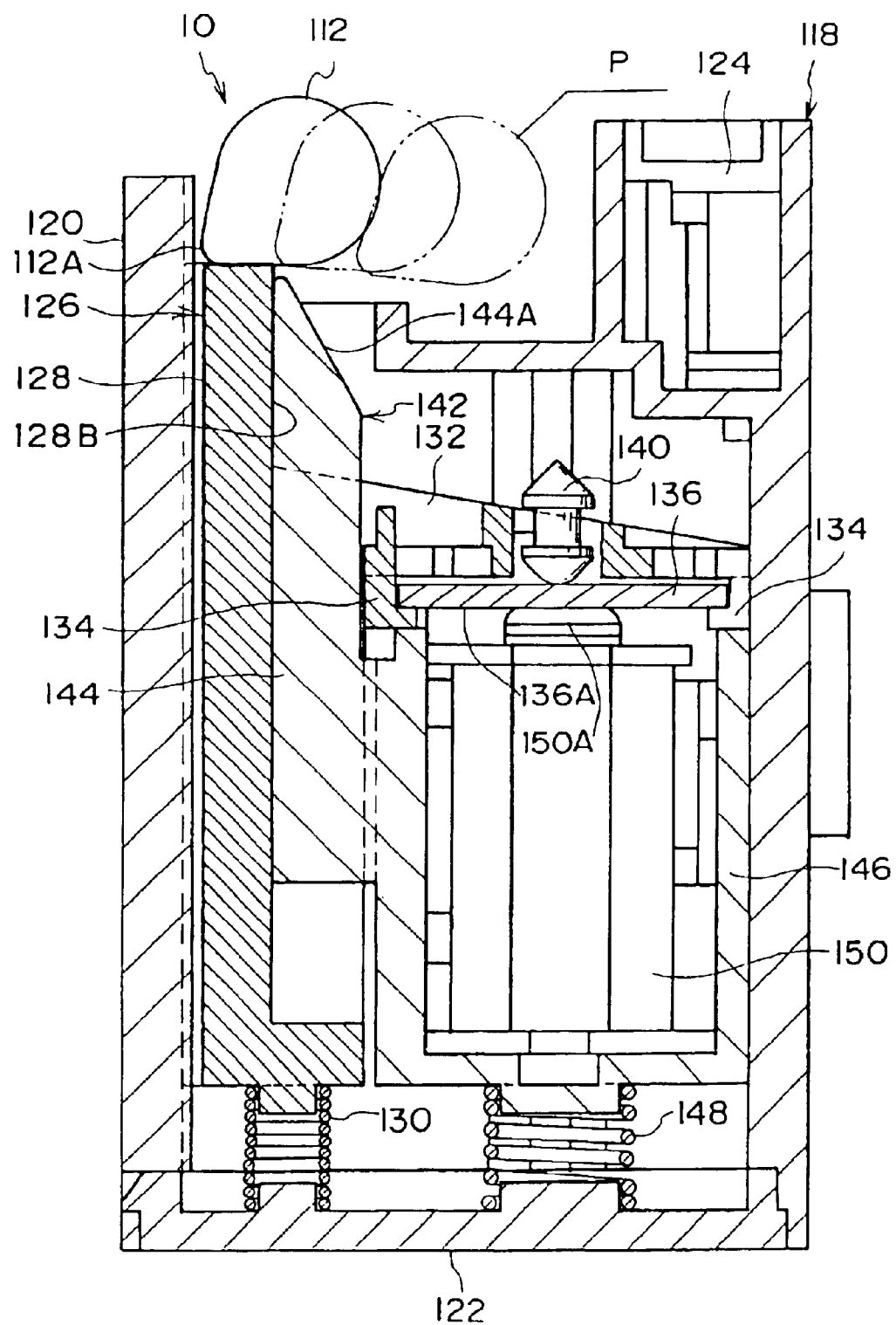
FIG. 11 is a cross-sectional view showing a state in which the slider and the magnet are moved downward and the stopper is disposed at a releasing position, in the shift lock mechanism of the shift lever device relating to the first embodiment.

On the other hand, when the brake is operated at this time, as shown in FIG. 11, the magnet 150 generates magnetic force, and due to this magnetic force, the yoke 136 is adhered to the magnet 150. Thus, the stopper 126 moves downward and is disposed in the releasing position (the lower side position) (lever unlock state B). In this way, the movement of the lever 112 is not impeded by the vertical wall 128 of the stopper 126, the shift lever 12 can be sufficiently turned to the left of the vehicle, and the shift lever 12 can be turned toward the rear of the vehicle. Accordingly, changing from the "P" shift position of the shift lever 12 to the "R" shift position is permitted.

Further, in a case in which the shift lever 12 is changed from the "R" shift position to the "P" shift position, when the shift lever 12 is turned toward the front of the vehicle, due to the inclined surfaces 128A of the vertical wall 128 of the stopper 126 being pushed by the movement of the lever 112, the stopper 126 moves downward and is disposed at the releasing position, and the yoke 136, which moves together with the stopper 126, pushes the magnet 150, and the slider 142 is moved downward. In this way, the movement of the lever 112 is not impeded by the vertical wall 128 of the stopper 126 and the slide wall 144 of the slider 142, and the shift lever 12 can be sufficiently turned toward the front of the vehicle, and the shift lever 12 can be turned toward the right of the vehicle. Accordingly, there is a structure in which the shift lever 12 can be changed from the "R" shift position to the "P" shift position.

Moreover, the shift lock unit 88 is, via the aforementioned connector 92, connected to a key interlock mechanism 200 (see FIG. 14) which serves as a lock mechanism.

Figure 14:
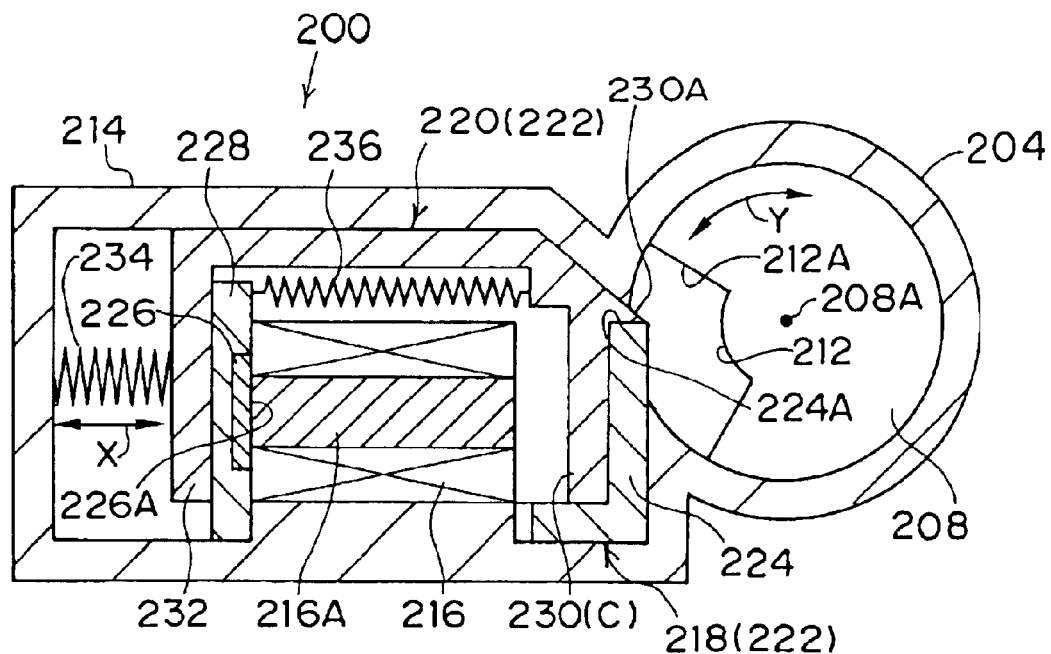
FIG. 14 is a cross-sectional view showing a state in which an ignition key is at a key rotation operation position, in a key interlock mechanism relating to the first embodiment.
Figure 17:
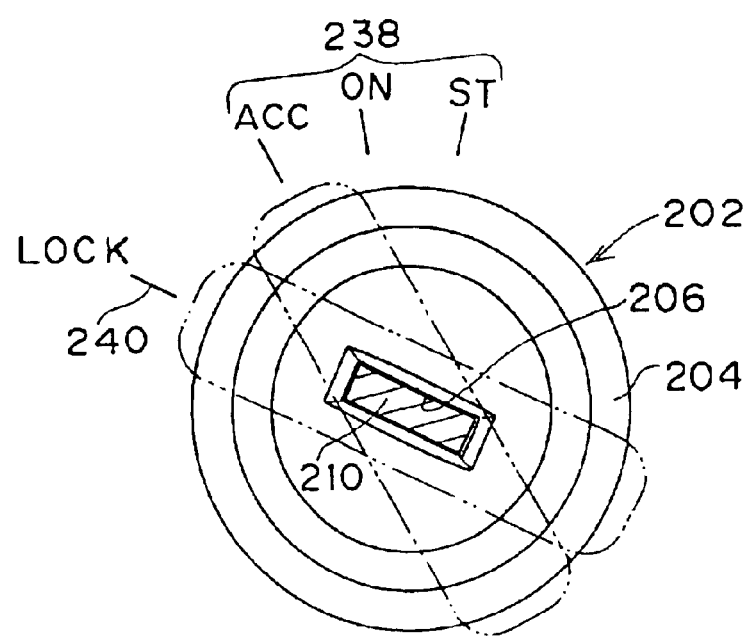
FIG. 17 is a front view schematically showing a key operation portion of a vehicle relating to the first embodiment.

In the key interlock mechanism 200, at a key operation portion 202 shown in FIG. 17, a key insertion/removal hole 206 is formed at the surface side of a body 204. As shown in FIG. 14, a lock cam 208, which serves as an interlocking member and a member to be locked, is rotatably supported at the reverse side of the body 204. When an ignition key 210 (an operation member) is inserted into the key insertion/removal hole 206 and is rotated and operated, the lock cam 208 interlocks with the ignition key 210, and can rotate in a given rotational range around a rotation central line 208A. A concave portion 212 is formed at the outer periphery of the lock cam 208. An abutment surface 212A, which is used as both an anchor surface and an anchor releasing surface, is formed at the concave portion 212.

A case 214 is formed integrally with the body 204 next to the lock cam 208. Within the case 214, in addition to an electromagnet 216 being fixed, a lock member 222, which has an anchor member 218 and a releasing member 220, is accommodated so as to be movable with respect to the case 214 and the electromagnet 216. At the anchor member 218 of the lock member 222, a stopper portion 224 is formed so as to face the lock cam 208, and an attraction portion 228, which has a yoke 226, is formed to face a fixed iron core 216A of the electromagnet 216, at the side opposite the stopper portion 224 with the electromagnet 216 therebetween. At the releasing member 220 of the lock member 222, an abutment portion 230 is formed between the stopper portion 224 of the anchor member 218 and the electromagnet 216, and a pusher portion 232, which sandwiches the attraction portion 228 of the anchor member 218 between the pusher portion 232 and the electromagnet 216, is formed. The anchor member 218 and the releasing member 220 are relatively movable in direction X of a attracting force F (see FIG. 16) of the fixed iron core 216A of the electromagnet 216 which works with respect to a attraction surface 226A of the yoke 226 of the anchor member 218.

In addition to the anchor member 218 and the releasing member 220, the lock member 222 is equipped with a compression coil spring 234 (spring) connected between the pusher portion 232 of the releasing member 220 and the case 214, and a compression coil spring 236 (spring) connected between the abutment portion 230 of the releasing member 220 and the attracting portion 228 of the anchor member 218. Due to the elastic force of the compression coil spring 234, the anchor member 218 and the releasing member 220 are urged toward the aforementioned lock cam 208. Due to the elastic force of the compression coil spring 236, the releasing member 220 is urged toward the opposite side of the aforementioned lock cam 208 with respect to the anchor member 218. An anchor surface 224A is formed at the stopper portion 224 of the anchor member 218, and an anchor releasing surface 230A is formed at the abutment portion 230 of the releasing member 220, adjacent to the anchor surface 224A. The moving direction of the anchor surface 224A and the anchor releasing surface 230A (direction X of the attracting force F of the electromagnet 216) intersects with direction Y of the locus of rotation of the abutment surface 212A of the lock cam 208.

In the state shown in FIG. 14, at the shift operation portion 80 shown in FIG. 18, the shift lever 12 is operated at the "P" shift position (park position P), and the ignition key 210 shown in FIG. 17 is operated at a key rotation operation position 238 (for example, the ACC position, among the ACC position and the ON position and ST). Both the anchor member 218 and the releasing member 220 of the lock member 222 are urged toward the lock cam 208 by the elastic force of the aforementioned compression coil spring 234, the attraction portion 228 of the anchor member 218 abuts the electromagnet 216 which is in a demagnetized state, and the pusher portion 232 of the releasing member 220 abuts the attracting portion 228. Further, the stopper portion 224 of the anchor member 218 and the abutment portion 230 of the releasing member 220 abut each other, the anchor surface 224A of the stopper portion 224 enters into the locus of rotation of the abutment surface 212A of the lock cam 208, and the anchor releasing surface 230A of the abutment portion 230 also is in the engageable state C and enters into the locus of rotation of the abutment surface 212A of the lock cam 208.

Figure 15:
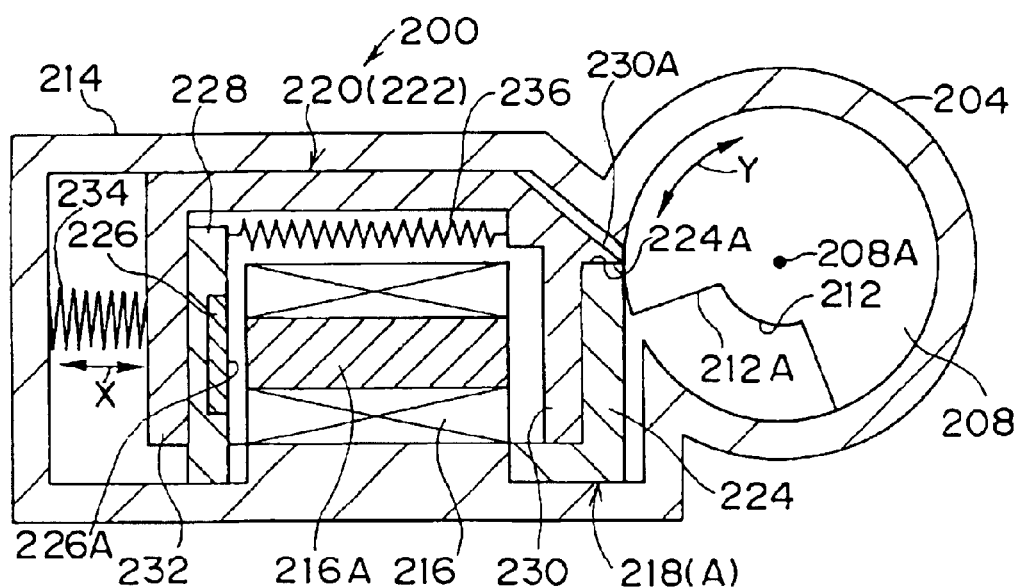
FIG. 15 is a cross-sectional view showing a lock released state of the ignition key, in the key interlock mechanism relating to the first embodiment.

From the state shown in FIG. 14, in a case in which an attempt is made to rotate the ignition key 210 shown in FIG. 17 to a key insertion/removal possible position 240 (the LOCK position), it is structured electrically such that the demagnetized state of the aforementioned electromagnet 216 is maintained and the attracting force F is cancelled. Thus, when the abutment surface 212A of the lock cam 208 presses the anchor releasing surface 230A of the abutment portion 230 of the releasing member 220, as shown in FIG. 15, the releasing member 220 moves against the elastic force of the compression coil spring 234 and the anchor releasing surface 230A withdraws from the engageable state C, and the anchor member 218 as well is pushed by the releasing member 220 via the compression coil spring 236 and withdraws, and a key unlock state A (unlock state) arises. In this key unlock state A, the abutment surface 212A of the lock cam 208 can pass by without abutting the anchor surface 224A of the stopper portion 224 of the anchor member 218. Thus, the ignition key 210 can be operated from the key rotation operation position 238 (the ACC position) to the key insertion/removal possible position 240 (the LOCK position) and pulled out.

Figure 16:
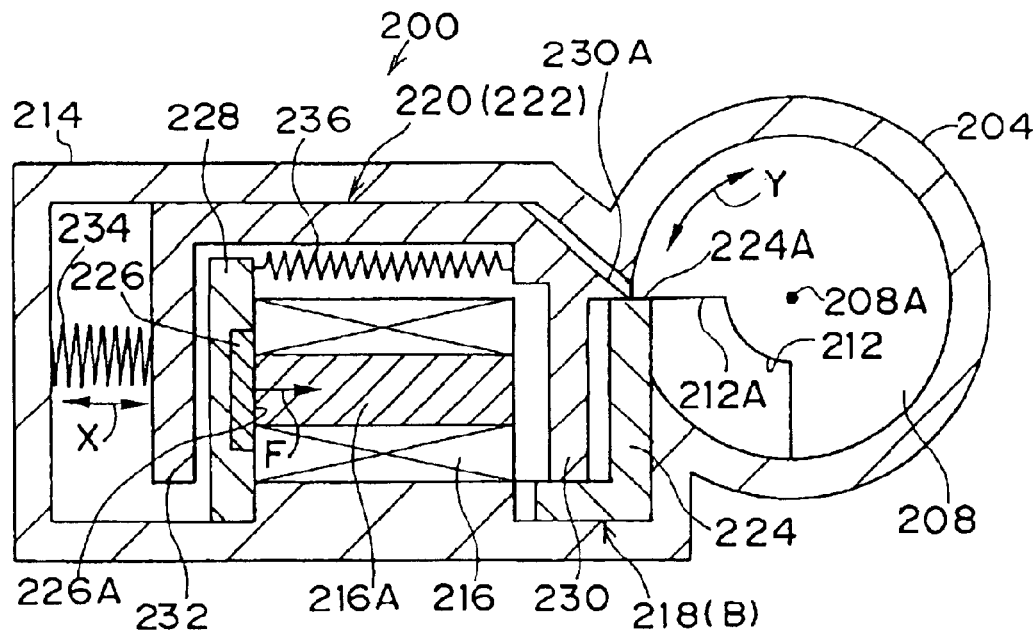
FIG. 16 is a cross-sectional view showing a locked state of the ignition key, in the key interlock mechanism relating to the first embodiment.

In the shift operation portion 80 shown in FIG. 18, in the state in which the shift lever 12 is operated to a position 242 other than the "P" shift position, in a case in which an attempt is made to rotate the ignition key 210 shown in FIG. 17 to the key insertion/removal possible position 240 (the LOCK position), it is structured electrically such that the electromagnet 216 in the demagnetized state is excited and the attracting force F thereof is generated. Thus, when the abutment surface 212A of the lock cam 208 pushes the anchor releasing surface 230A of the abutment portion 230 of the releasing member 220, as shown in FIG. 16, only the releasing member 220 moves against the elastic force of the compression coil spring 234, and the anchor releasing surface 230A withdraws from the engageable state C. The anchor member 218 is attracted to the fixed iron core 216A of the electromagnet 216 at the attraction surface 226A of the yoke 226 thereof, and a key lock state B (lock state) arises. In this key lock state B, the abutment surface 212A of the lock cam 208 abuts the anchor surface 224A of the stopper portion 224 of the anchor member 218. Thus, the ignition key 210 cannot be operated from the key rotation operation position 238 (the ACC position) to the key insertion/removal possible position 240 (the LOCK position) and cannot be pulled out.

In the key unlock state A shown in FIG. 15, in a case in which the ignition key 210 is rotated from the key insertion/removal possible position 240 (the LOCK position) to the key rotation operation position 238 (the ACC position), the aforementioned electromagnet 216 returns to the state shown in FIG. 14 while the demagnetized state is maintained and the attracting force F thereof remains cancelled. Further, in the key lock state B shown in FIG. 16, in a case in which the ignition key 210 is rotated to the key rotation operation position 238 (the ACC position), the electromagnet 216 in the excited state is demagnetized, the attracting force F thereof is canceled, and the electromagnet 216 returns to the state shown in FIG. 14.

Next, operation of the present embodiment will be described.

In the shift lever device 10 of the above-described structure, if the brake is not operated when the shift lever 12 is turned from the "P" shift position to the "R" shift position side, the magnet 150 of the shift lock mechanism 118 does not generate magnetic force. Thus, as shown in FIG. 10, the stopper 126 is disposed at the lock position without the yoke 136 adhering to the magnet 150. In this way, the change from the "P" shift position of the shift lever 12 to the "R" shift position is impeded by the stopper 126.

On the other hand, if the brake is operated when the shift lever is turned from the "P" shift position to the "R" shift position side, the magnet 150 generates magnetic force. Thus, as shown in FIG. 11, due to the yoke 136 adhering to the magnet 150 due to this magnetic force, the stopper 126 is moved to the releasing position. In this way, the change from the "P" shift position of the shift lever to the "R" shift position is permitted.

In accordance with this shift lock mechanism 118, the attracting force of the fixed iron core 150A of the magnet 150 is utilized in switching between the lever lock state A and the lever unlock state B. Thus, as compared with a conventional case using the plunger (movable iron core) of an electromagnetic solenoid, rising and falling of the iron core 150A is eliminated and the mechanism can be made more compact. Further, the movement of the iron core 150A is suppressed, and the amount of electric power can be reduced.

Moreover, in the lever lock state A in which the brake is not depressed, the magnet 150 is in an un-energized state. Thus, the amount of electric power can be reduced even more.

Further, due to the stopper 126 and the slider 142 which form the lock member, the switching between the lever lock state A and the lever unlock state B is carried out smoothly by utilizing the attracting force of the fixed iron core 150A of the magnet 150.

Moreover, the stopper 126 and the slider 142 forming the lock member can be brought together compactly, and the mechanism can be made compact.

Further, due to the compression coil spring 130 which urges the stopper 126 to return to the lever lock state A from the lever unlock state B, the switching between the lever lock state A and the lever unlock state B can be carried out even more smoothly by utilizing the attracting force of the fixed iron core 150A of the magnet 150.

Moreover, due to the compression coil spring 148 which urges the slider 142 to return to the aforementioned engageable state C, the switching between the lever lock state A and the lever unlock state B can be carried out even more smoothly by utilizing the attracting force of the fixed iron core 150A of the magnet 150.

Figure 12:
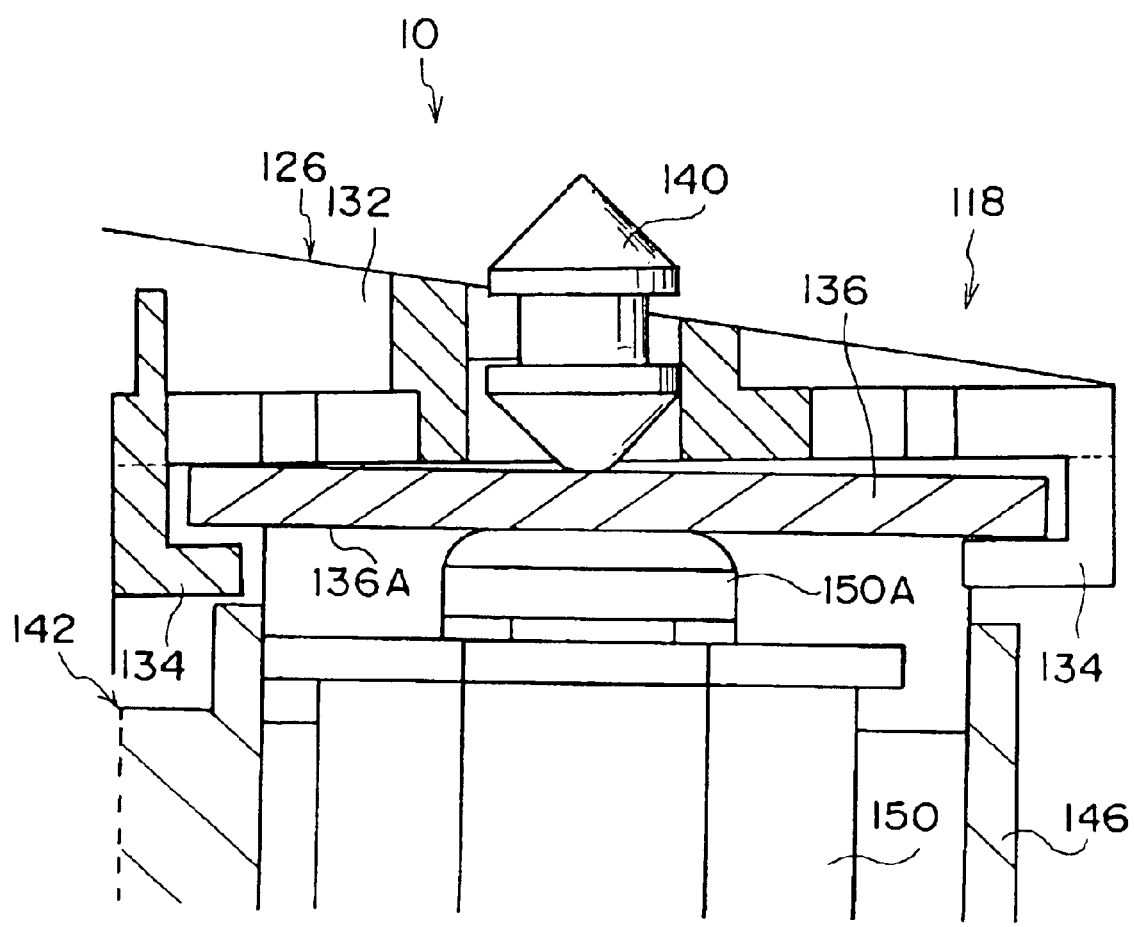
FIG. 12 is a cross-sectional view showing a state in which a yoke is inclined in correspondence with inclination of the magnet, in the shift lock mechanism of the shift lever device relating to the first embodiment.

Further, here, the yoke 136 is provided so as to be freely inclinable at the stopper 126. Thus, even in a case in which the magnet 150 is inclined with respect to the yoke 136 when the yoke 136 adheres to the magnet 150 due to dispersion in the dimensions at the case 120, the cap 122, the stopper 126, the yoke 136, the slider 142, or the magnet 150 or the like or dispersion in the assembly thereof or the like arising, a gap can be prevented from opening between the yoke 136 and the magnet 150 due to the yoke 136 inclining in accordance with the inclination of the magnet 150 as shown in FIG. 12. Thus, a deterioration in the close fit between the yoke 136 and the magnet 150 is prevented, and the adhesive force of the yoke 136 and the magnet 150 can be prevented from deteriorating.

Moreover, due to the pair of holding claws 134 provided at the stopper 126 respectively projecting in L-shapes in cross-section toward the magnet 150 side and supporting the end portions of the yoke 136, the yoke 136 is freely inclinable with respect to the stopper 126. Thus, with a simple structure, the yoke 136 can be provided so as to be freely inclinable with respect to the stopper 126.

Further, the cushion 140 provided at the stopper 126 is elastic and pushes the yoke 136 toward the magnet 150 side. Thus, clattering of the yoke 136 can be suppressed, and the abutment noise of the yoke 136 and the magnet 150 when the yoke 136 adheres to the magnet 150 can be prevented from resonating.

Figure 19:
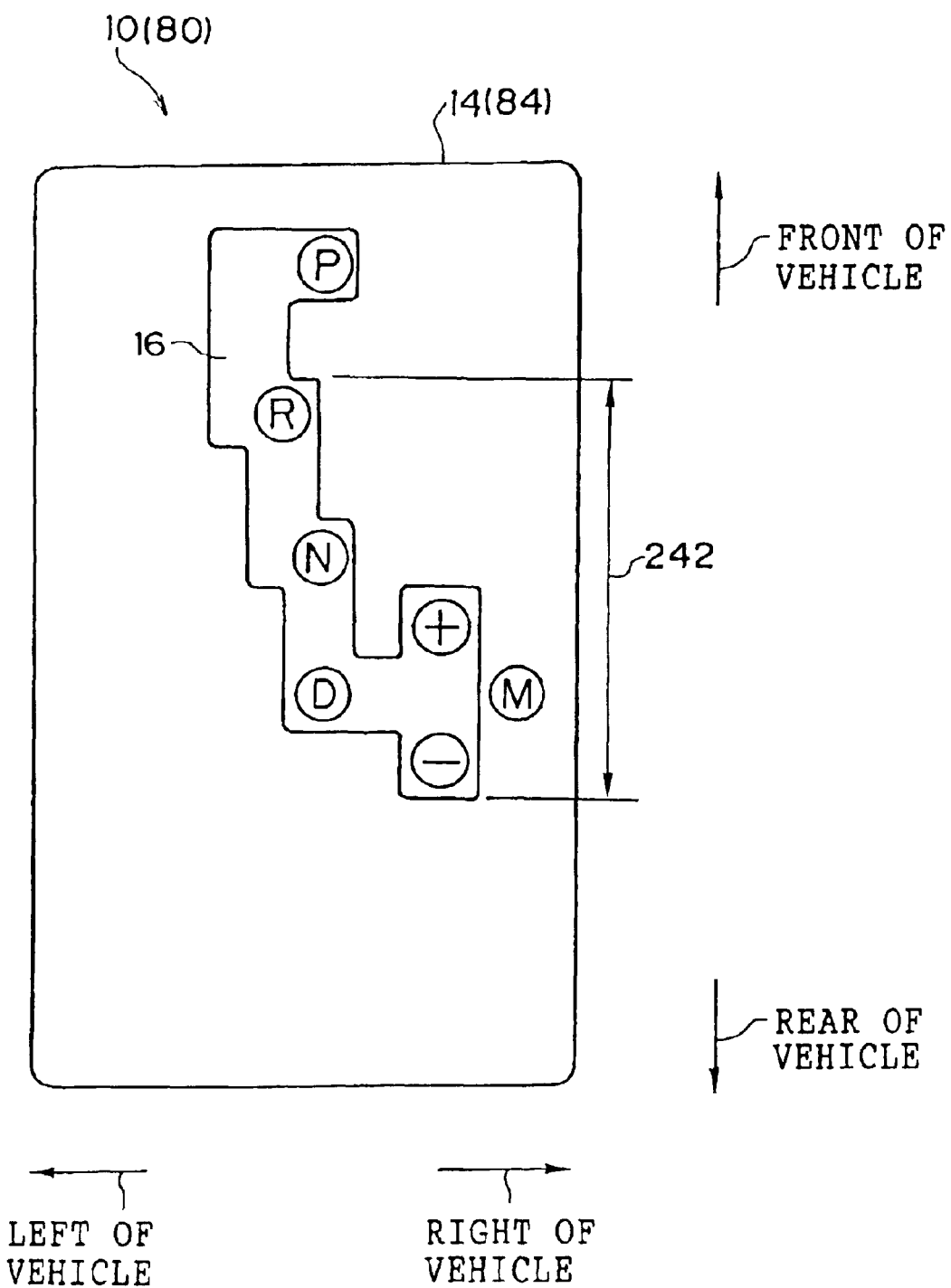
FIG. 19 is a plan view schematically showing a cover in a tiptronic-type gate-type shift lever device relating to another example of the first embodiment.

Note that, in the present embodiment, the shift lever device 10 is structured to be a gate-type device. However, the shift lever device may be structured to be a so-called tiptronic-type gate-type device such as shown in FIG. 19 or a so-called straight-type (including the tiptronic-type) device such as shown in FIG. 20.

Figure 20:
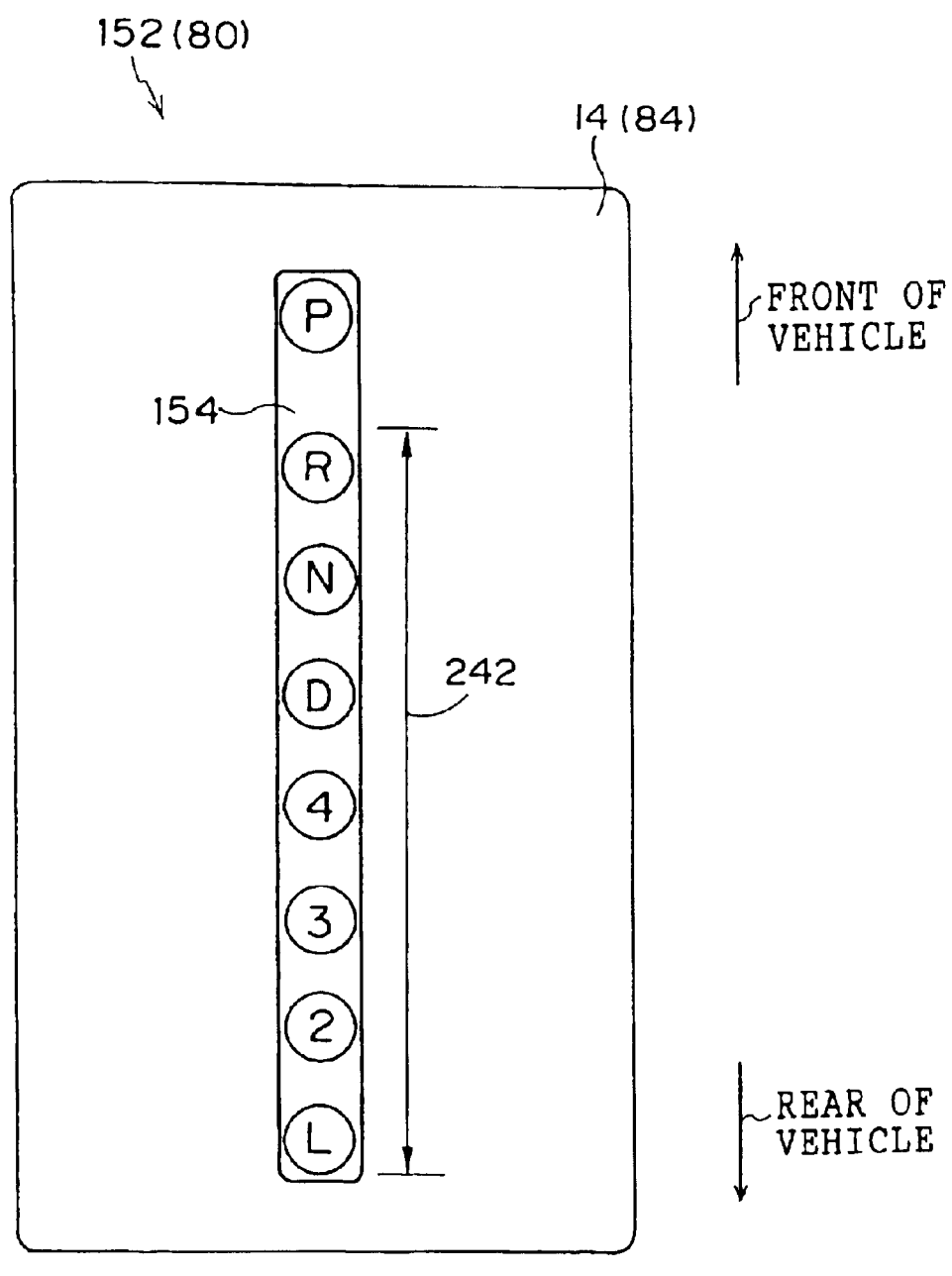
FIG. 20 is a plan view schematically showing a cover in a straight-type shift lever device relating to another example of the first embodiment.

Here, in a straight-type shift lever device 152 shown in FIG. 20, the shift position can be changed by guiding the shift lever in a guide hole 154 and turning the shift lever only in the vehicle longitudinal direction.

Further, generally, in the straight-type shift lever device 152, a knob button is provided at the distal end of the shift lever, and a detent pin is provided in a vicinity of the proximal end of the shift lever. Due to the knob button being pressed, the detent pin slides toward the axial direction of the shift lever. Moreover, a detent plate, in which a predetermined detent groove is formed, is set in a vicinity of the shift lever. This is a structure in which, if the knob button is not pushed when the shift lever is positioned at the "P" shift position, the detent pin cannot ride over the detent groove, and changing to the "R" shift position of the shift lever is impeded.

Thus, in order to equip the straight-type shift lever device 152 with the shift lock mechanism 118, it suffices to form a structure in which the shift lock mechanism 118 is provided in correspondence with the position of the detent pin at the time when, for example, the shift lever is disposed at the "P" shift position. Namely, if the brake is not operated when the shift lever is turned from the "P" shift position to the "R" shift position side, the vertical wall 128 of the stopper 126 disposed at the lock position impedes the sliding of the detent pin. Thus, the knob button cannot be pressed and the change to the "R" shift position of the shift lever is impeded, whereas if the brake is operated at this time, the vertical wall 128 of the stopper 126 is disposed at the releasing position, and the sliding of the detent pin is not impeded. Thus, it suffices to form a structure in which a shift lock solenoid 18 is set at a position at which the knob button can be pressed and the change to the "R" shift position of the shift lever is permitted.

Moreover, the present embodiment is a structure in which, when the brake is operated at the time the shift lever is turned from the "P" shift position (a predetermined shift position) to the "R" shift position (another shift position) side, the magnet 150 generates magnetic force. However, a structure may be used in which the magnet generates magnetic force under other predetermined conditions. Or, a structure may be used in which the magnet demagnetizes the magnetic force due to a specific condition (e.g., brake operation at the time when the shift lever is turned from a predetermined shift position to another shift position side).

Moreover, the present embodiment is structured such that, when the magnet 150 does not generate magnetic force, the stopper 126 is disposed at the lock position, whereas when the magnet 150 generates magnetic force, the stopper 126 is disposed at the releasing position. However, a structure may be used in which, when the magnet does not generate magnetic force, the stopper is disposed at the releasing position, whereas when the magnet generates magnetic force, the stopper is disposed at the lock position.

Further, the present embodiment is structured such that the yoke 136 is provided at the stopper 126 and the magnet 150 is provided at the slider 142. However, a structure may be used in which the yoke and the magnet are provided at other parts (e.g., a structure in which the magnet is provided at the stopper and the yoke is provided at the slider). Moreover, a structure may be used in which only the stopper (the anchor member) is provided without providing the slider, and either one of the magnet and the yoke is provided at the stopper, and the other of the magnet and the yoke is fixed to the case. In this case, when the magnet does not generate magnetic force, the stopper is disposed at the lock position due to urging force, whereas when the magnet generates magnetic force, the stopper moves to the releasing position due to the magnetic force.

Moreover, the present embodiment is structured such that a pair of the holding claws 134 is provided at the stopper 126. However, a structure may be used in which only one, or three or more holding claws are provided at the stopper.

Further, in a case in which the orientation or the place of setting the shift lock mechanism 118 is changed and the shift lock mechanism 118 is disposed, there is no need to provide the portion to be locked, which corresponds to the lever 112, integrally with the shift lever 12, and no need to provide the fulcrum of rotation which is the rotating shaft 86. The portion to be locked may be interlocked with the shift lever 112 via a link mechanism or the like.

Moreover, as shown in FIG. 18, at the shift lever device 10, due to the turning position, in the vehicle longitudinal direction, of the shift lever 12 being changed, the "D" shift position and the "2" shift position of the shift lever 12 are changed.

Further, due to the shift lever 12 being turned toward the right of the vehicle from the "D" shift position, the shift lever 12 is changed to the "4" shift position. At this time, the link 30 of the shift lock unit 88 is rotated in the direction of arrow A in FIG. 5 by the shift lever 12. On the other hand, due to the shift lever 12 being turned toward the left of the vehicle from the "2" shift position, the shift lever 12 is changed to the "L" shift position. At this time as well, the link 30 is rotated in the direction of arrow A in FIG. 5 by the shift lever 12.

Moreover, the turning position, in the vehicle longitudinal direction, of the shift lever 12 is detected by the NSS 18 shown in FIG. 8. In this way, in a case in which, as in the present embodiment, the turning position, in the vehicle longitudinal direction, of the shift lever 12 is the same at the "D" shift position and the "4" shift position and is the same at the "2" shift position and the "L" shift position, it can be detected which of the "D" shift position or the "4" shift position, and the "2" shift position or the "L" shift position, the shift lever 12 is positioned at.

Further, the rotational position of the link 30 is detected by the slider 38 shown in FIG. 5 and the detecting member 48. In this way, it can be detected which of the "D" shift position or the "2" shift position, and the "4" shift position or the "L" shift position, the shift lever 12 is positioned at.

Accordingly, by the NSS 18, the slider 38, and the detecting member 48, it can be detected which of the "D" shift position and the "4" shift position and the "2" shift position and the "L" shift position, the shift lever 12 is positioned at.

Here, the link 30 is rotated in the same direction of arrow A in FIG. 5, when the shift lever 12 is changed from the "D" shift position to the "4" shift position, and when the shift lever 12 is changed from the "2" shift position to the "L" shift position. Thus, the sliding direction of the slider 38, which detects the rotational position of the link 30, is only one, and the amount of sliding is small. In this way, the placement size (width W in FIG. 5) of the detecting member 48 can be made small. The placement space of the detecting member 48 can be made compact, and accordingly, compactness of the device can be aimed for.

Further, here, the rotation central axis P of the link 30 is disposed between the "D" shift position of the shift lever 12 and the "2" shift position. The link 30 is rotatable parallel to the vertical plane along the vehicle longitudinal direction (the plane of turning, in the predetermined direction, of the shift lever 12).

Moreover, when the shift lever 12 is changed from the "D" shift position to the "4" shift position, due to the switching plate 26 of the shift lever 12 displacing the first arm 32 of the link 30 toward the bottom of the vehicle, the link 30 is rotated in the direction of arrow A in FIG. 5.

On the other hand, when the shift lever 12 is changed from the "2" shift position to the "L" shift position, due to the switching rod 28 of the shift lever 12 displacing the second arm 34 of the link 30 toward the top of the vehicle, the link 30 is rotated in the direction of arrow A in FIG. 5.

Thus, a structure in which the link 30 is always rotated in the same direction can easily be realized.

Further, even in cases in which the amount of turning of the shift lever 12 is different when the shift lever 12 is changed from the "D" shift position to the "4" shift position and when the shift lever 12 is changed from the "2" shift position to the "L" shift position, by adjusting the angle of inclination of the receiving portion 32A of the first arm 32 distal end or the angle of inclination of the bent portion 34A bottom surface of the second arm 34 distal end, the amount of rotation of the link 30 can be made to always be the same.

Moreover, here, as shown in FIG. 8, the signal regarding the turning position, in the vehicle longitudinal direction, of the shift lever 12 which is detected by the NSS 18, is transmitted to the detecting member 48, and switching is carried out on the basis of the rotational position of the link 30 for which the transmission direction of the received signal was detected by the detecting member 48. Thus, the shift position detecting mechanism of the shift lever 12 can be structured simply as compared with a case in which the signal regarding the turning position, in the vehicle longitudinal direction, of the shift lever 12 which is detected by the NSS 18, and the signal regarding the rotational position of the link 30 detected by the detecting member 48, are transmitted in a state of being multiplexed.

Further, as shown in FIG. 1, in accordance with the shift lock unit 88, the shift lock mechanism 118, and the link 30, the slider 38, and the detecting member 48, which serve as the sensing mechanism, are provided integrally. Thus, compactness can be aimed for as compared with a case in which the shift lock mechanism and the sensing mechanism are provided separately.

Figure 4:
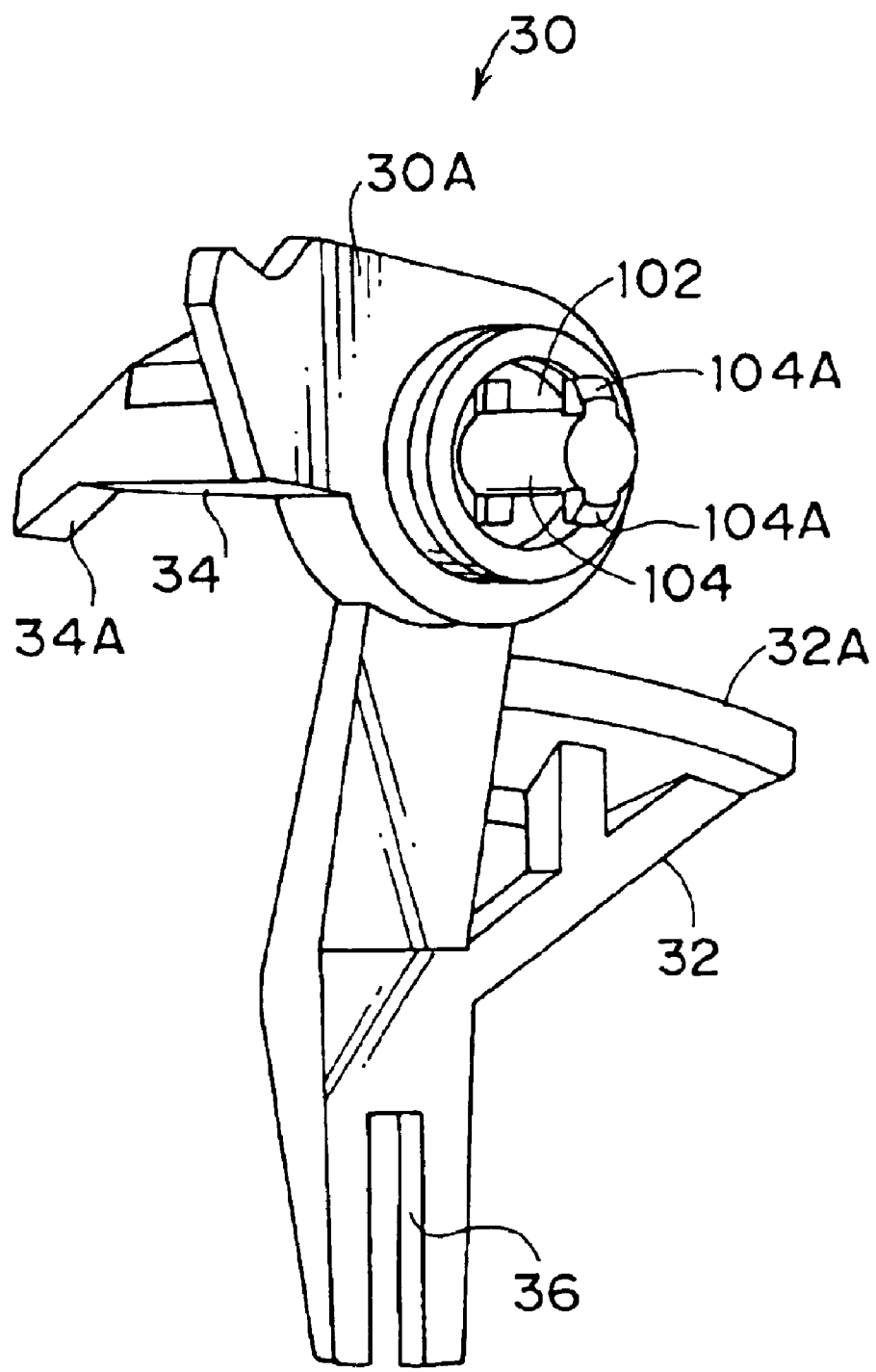
FIG. 4 is a perspective view, as seen from a reverse surface side, showing a link of the shift lever device relating to the first embodiment.

Moreover, as shown in FIG. 3 and FIG. 4, the rotation of the link 30 is guided by the fitting-together of the penetrating shaft 104 of the link 30 into the through hole 100 of the housing 88A, the fitting-together of the supporting shaft 98 peripheral surface of the housing 88A with the fit-together concave portion 102 inner peripheral surface of the link 30, the anchoring of the anchor projections 104A of the link 30 on the projecting portion 96 of the housing 88A, and the abutting of the fit-together concave portion 102 bottom surface with the supporting shaft 98 side surface. In addition, the bottom portion of the link main body 30A is inserted between the guide wall 110A and the guide projecting portion 110B of the housing 88A in a state of abutting both, and the rotation of the link 30 is guided by the guide wall 110A and the guide projecting portion 110B. In this way, the rotation of the link 30 can be prevented from moving in the rotation perpendicular direction (the vehicle left-right direction).

Further, by rotating the link 30 until the rotational positions of the respective anchor projections 104A of the link 30 coincide with the respective insertion holes 100A of the housing 88A, the link 30 can be removed from the supporting shaft 98 of the housing 88A. Thus, in cases in which, differently from the present embodiment, the link 30 is not needed in a tiptronic-type gate-type shift lever device such as shown in FIG. 19 or a straight-type (including the tiptronic-type) shift lever device such as shown in FIG. 20, the link 30 can be easily removed from the shift lock unit 88, and the shift lock unit 88 can be commonly used in these shift lever devices as well.

Moreover, when the link 30 is rotated in the direction of arrow A in FIG. 5 by the shift lever 12, the torsion coil spring 106 applies torque in the opposite direction of arrow A to the link 30 and restores the link 30 to the initial rotational position. The link 30, which is restored to the initial rotational position, abuts the elastic member 108 which is elastic. Thus, the generation of abutment noise when the link 30 is restored to the initial rotational position can be prevented.

Note that, the present embodiment is structured such that, when the shift lever 12 is changed from the "D" shift position (the first shift position) to the "4" shift position (the third shift position), the first arm 32 is displaced toward the bottom of the vehicle (the proximal end side of the shift lever 12), whereas when the shift lever 12 is changed from the "2" shift position (the second shift position) to the "L" shift position (the fourth shift position), the second arm 34 is displaced toward the top of the vehicle (the distal end side of the shift lever 12). However, a structure may be used in which, when the shift lever is changed from the first shift position to the third shift position, the first arm is displaced toward the distal end side of the shift lever, whereas when the shift lever is changed from the second shift position to the fourth shift position, the second arm is displaced toward the proximal end side of the shift lever.

Figure 21:
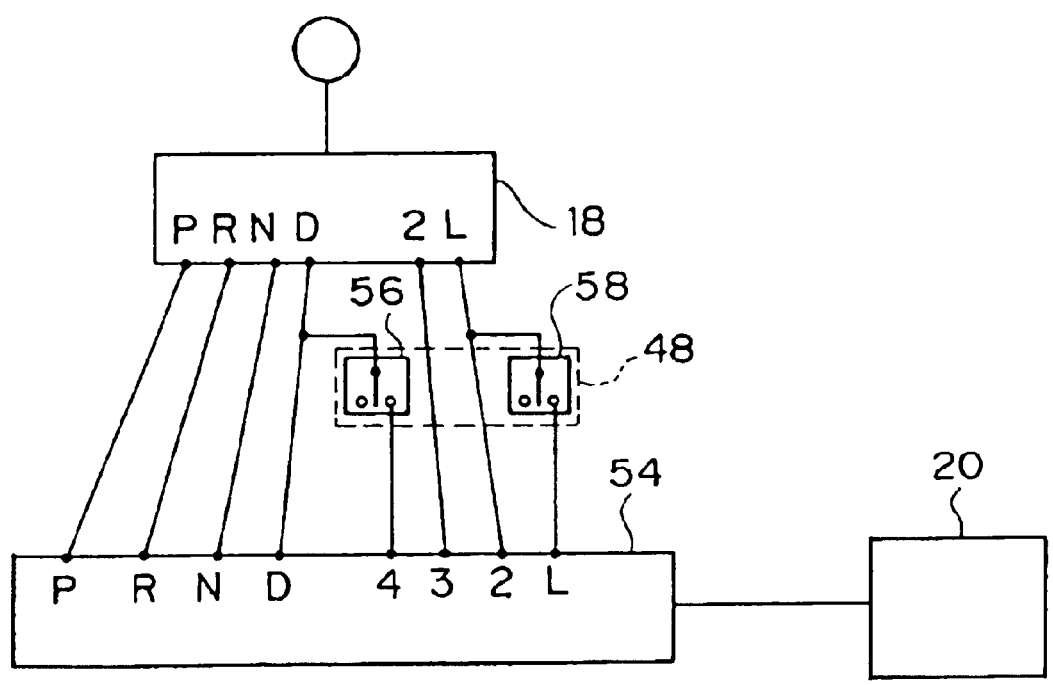
FIG. 21 is a circuit diagram showing a connected state of an NSS an engine controlling device, a meter, a "D-4" switch, and a "2-L" switch of a shift lever device relating to another example of the first embodiment.

Moreover, the present embodiment is structured such that the NSS 18 is directly connected to the meter 20. However, as shown in FIG. 21, a structure may be used in which the NSS 18 (first detecting portion) is connected indirectly to the meter 20 via a so-called engine controlling device 54.

Namely, in the case of this structure, a "P" intermediate terminal, an "R" intermediate terminal, an "N" intermediate terminal, a "D" intermediate terminal, a "4" intermediate terminal, a "3" intermediate terminal, a "2" intermediate terminal, and an "L" intermediate terminal are provided at the engine controlling device 54.

The "P" intermediate terminal, the "R" intermediate terminal, the "N" intermediate terminal, the "D" intermediate terminal, the "3" intermediate terminal, and the "2" intermediate terminal of the engine controlling device 54 are connected to the "P" terminal, the "R" terminal, the "N" terminal, the "D" terminal, the "2" terminal and the "L" terminal of the NSS 18, respectively.

The wire between the "D" intermediate terminal of the engine controlling device 54 and the "D" terminal of the NSS 18, and the "4" intermediate terminal of the engine controlling device 54 are connected in a state in which a "D-4" switch 56 is interposed therebetween. The "D-4" switch 56 enables ON/OFF of the connection of the "D" terminal and the "4" intermediate terminal.

The wire between the "2" intermediate terminal of the engine controlling device 54 and the "L" terminal of the NSS 18, and the "L" intermediate terminal of the engine controlling device 54 are connected in a state in which a "2-L" switch 58 is interposed therebetween. The "2-L" switch 58 enables ON/OFF of the connection of the "L" terminal and the "L" intermediate terminal.

Here, when a signal from the "P" terminal, the "R" terminal, the "N" terminal or the "2" terminal of the NSS 18 is transmitted, the signal is received by the "P" intermediate terminal, the "R" intermediate terminal, the "N" intermediate terminal, or the "3" intermediate terminal of the engine controlling device 54, respectively, and the "P" lamp, the "R" lamp, the "N" lamp, or the "3" lamp of the meter 20 is lit.

Further, the aforementioned "D-4" switch 56 corresponds to the "D" terminal 52A, the "4" terminal 52B, and the "D-4" terminal 52C of the detecting member 48, whereas the aforementioned "2-L" switch 58 corresponds to the "2-L" terminal 52D, the "2" terminal 52E, and the "L" terminal 52F of the detecting member 48.

When the shift lever 12 is positioned at the "D" shift position or the "2" shift position, due to the distal ends of the respective contact plates 44 contacting the "D" terminal 52A, the "D-4" terminal 52C, the "2-L" terminal 52D, and the "2" terminal 52E of the detecting member 48 respectively, at the "D-4" switch 56, the connection between the "D" terminal of the NSS 18 and the "4" intermediate terminal of the engine controlling device 54 is turned OFF, and at the "2-L" switch 58, the connection between the "L" terminal of the NSS 18 and the "L" intermediate terminal of the engine controlling device 54 is turned OFF. Thus, due to the signal from the "D" terminal or the "L" terminal being transmitted, only the "D" intermediate terminal or only the "2" intermediate terminal, respectively, receives this signal, and the "D" lamp or the "2" lamp of the meter 20 is turned on.

Further, when the shift lever 12 is positioned at the "4" shift position or the "L" shift position, due to the distal ends of the respective contact plates 44 contacting the "4" terminal 52B, the "D-4" terminal 52C, the "2-L" terminal 52D, and the "L" terminal 52F of the detecting member 48 respectively, at the "D-4" switch 56, the connection between the "D" terminal of the NSS 18 and the "4" intermediate terminal of the engine controlling device 54 is turned ON, and at the "2-L" switch 58, the connection between the "L" terminal of the NSS 18 and the "L" intermediate terminal of the engine controlling device 54 is turned ON. Thus, due to the signal from the "D" terminal or the "L" terminal being transmitted, the "D intermediate terminal and the "4" intermediate terminal, or the "2" intermediate terminal and the "L" intermediate terminal, respectively, receive this signal, and the "4" lamp or the "L" lamp of the meter 20 is turned on.

Moreover, at the key interlock mechanism 200 shown in FIG. 14, the shift lever 12 being operated at the "P" shift position is detected by the shift position detecting portion 94 (see FIG. 2 and the like) of the shift lock unit 88. In a case in which an attempt is made to rotate the ignition key 210 from the state in which the ignition key 210 shown in FIG. 17 is operated at the key rotation operation position 238 (the ACC position) to the key insertion/removal possible position 240 (the LOCK position), the electromagnet 216 is set in a demagnetized state, and the attracting force F thereof is cancelled. Thus, when the abutment surface 212A of the lock cam 208 presses the anchor releasing surface 230A of the abutment portion 230 of the releasing member 220, as shown in FIG. 15, the releasing member 220 moves against the elastic force of the compression coil spring 234, and the anchor releasing surface 230A thereof withdraws from the engageable state C. Further, the anchor member 218 as well is pushed by the releasing member 220 via the compression coil spring 236 and withdraws, and the key unlock state A arises. In this key unlock state A, the abutment surface 212A of the lock cam 208 can pass by without abutting the anchor surface 224A of the stopper portion 224 of the anchor member 218. Thus, the ignition key 210 can be operated from the key rotation operation position 238 (the ACC position) to the key insertion/removal possible position 240 (the LOCK position) and can be pulled out.

On the other hand, in a case in which an attempt is made to rotate the ignition key 210 to the key insertion/removal possible position 240 (the LOCK position) in the state in which the shift lever 12 is operated to the position 242 other than the "P" shift position, the electromagnet 216 which is in a demagnetized state is excited and the attracting force F thereof is generated. Thus, when the abutment surface 212A of the lock cam 208 presses the anchor releasing surface 230A of the abutment portion 230 of the releasing member 220, as shown in FIG. 16, only the releasing member 220 moves against the elastic force of the compression coil spring 234, and the anchor releasing surface 230A thereof withdraws from the engageable state C. The anchor member 218 is attracted to the fixed iron core 216A of the electromagnet 216 at the attraction surface 226A of the yoke 226, and the key lock state B arises. In this key lock state B, the abutment surface 212A of the lock cam 208 abuts the anchor surface 224A of the stopper portion 224 of the anchor member 218. Thus, the ignition key 210 cannot be operated from the key rotation operation position 238 (the ACC position) to the key insertion/removal possible position 240 (the LOCK position), and cannot be pulled out.

Here, in accordance with the key interlock mechanism 200, the attracting force of the fixed iron core 216A of the electromagnet 216 is used in switching between the key lock state B and the key unlock state A. Thus, as compared with a conventional case using the plunger (movable iron core) of an electromagnetic solenoid, rising and falling of the iron core 216A is eliminated, and the mechanism can be made more compact. Further, the movement of the iron core 216A can be suppressed, and the amount of electric power can be reduced.

Moreover, in the key unlock state A in which the ignition key 210 can be pulled out, the electromagnet 216 is un-energized. Thus, the amount of electric power can be reduced even more.

Further, due to the anchor member 218 and the releasing member 220 which form the lock member 222, the switching between the key lock state B and the key unlock state A can be carried out smoothly by utilizing the attracting force F of the fixed iron core 216A of the electromagnet 216.

Moreover, the anchor member 218 and the releasing member 220 which form the lock member 222 can be brought together compactly, and the mechanism can be made more compact.

Further, due to the compression coil spring 236 of the lock member 222 which urges the anchor member 218 to return to the key unlock state A from the key lock state B, switching between the key lock state B and the key unlock state A can be carried out even more smoothly by utilizing the attracting force F of the fixed iron core 216A of the electromagnet 216.

Moreover, due to the compression coil spring 234 of the lock member 222 which urges the releasing member 220 to return to the aforementioned engageable state C, switching between the key lock state B and the key unlock state A can be carried out even more smoothly by utilizing the attracting force F of the fixed iron core 216A of the electromagnet 216.

Further, the shift position detecting portion 94, which detects that the shift lever 12 is positioned at the "P" shift position, is provided at the shift lock unit 88. Thus, as compared with a case in which the shift position detecting portion is provided separately from the shift lock unit, even more compactness can be aimed for.

Moreover, the shift position detecting portion 94 can be removed from the shift lock unit 88. Thus, in a shift lever device which does not require the shift position detecting portion 94, in a case in which the key interlock mechanism is mechanically operated or the like, which is different than the present embodiment in which the key interlock mechanism 200 is operated electrically, the shift position detecting portion 94 can be removed from the shift lock unit 88, and the shift lock unit 88 can be used in this shift lever device as well.

Note that, in the present embodiment, the electromagnet 216 is fixed to the case 214, and the anchor member 218 and the releasing member 220 of the lock member 222 can move with respect to the case 214. In place of this structure, a structure is possible which is the same with respect to the point that the anchor member and the releasing member of the lock member can move with respect to the case, but the anchor member and the electromagnet can move integrally. In this case, the attraction surface which opposes the electromagnet is fixed to the case.

Further, a structure may be used in which, as the lock member 222, only either one of the anchor member 218 and the releasing member 220 is provided, and the either one of the anchor member 218 and the releasing member 220 is urged toward the side opposite the lock cam 208 side and can move toward the lock cam 208 side. In this case, either one of the electromagnet 216 and the attraction surface 226A is provided at the either one of the anchor member 218 and the releasing member 220, and the other of the electromagnet 216 and the attraction surface 226A is fixed to the case 214. In this way, when the electromagnet 216 is excited, either one of the anchor member 218 and the releasing member 220 moves toward the lock cam 208 side, and can abut the abutment surface 212A of the lock cam 208.

Moreover, the present embodiment is a structure in which the key interlock mechanism 200 is provided. However, a structure may be used in which the aforementioned shift lock mechanism 118 is used as the key interlock mechanism.

In this structure, the case 120 of the shift lock mechanism 118 is formed integrally with the body 204 next to the lock cam 208. Moreover, at the inclined surface of the distal end of the slider wall 144, the slider 142 of the shift lock mechanism 118 enters into the locus of rotation of the abutment surface 212A of the lock cam 208. Further, the stopper 126 of the shift lock mechanism 118 is fixed to the case 120.

Here, in this structure, the shift lever 12 being operated at the "P" shift position is detected by the shift position detecting portion 94 of the shift lock unit 88. When an attempt is made to rotate the ignition key 210 from the state in which the ignition key 210 shown in FIG. 17 is operated at the key rotation operation position 238 (e.g., the ACC position) to the key insertion/removal possible position 240 (the LOCK position), the magnet 150 is set in a demagnetized state, and the attracting force thereof is cancelled. Thus, when the abutment surface 212A of the lock cam 208 pushes the inclined surface of the distal end of the slide wall 144, the slider 142 moves against the elastic force of the compression coil spring 48 and withdraws from the engageable state C, and the key unlock state A (the unlock state) arises. In this key unlock state A, the abutment surface 212A of the lock cam 208 can pass by without obstructing the inclined surface of the distal end of the slide wall 144. Thus, the ignition key 210 can be operated from the key rotation operation position 238 (the ACC position) to the key insertion/removal possible position 240 (the LOCK position) and can be pulled out.

On the other hand, when an attempt is made to rotate the ignition key 210 to the key insertion/removal possible position 240 (the LOCK position) in the state in which the shift lever 12 is operated to the position 242 other than the "P" shift position, the magnet 150 which is in the demagnetized state is excited and the attracting force thereof is generated. As a result, the attraction surface 136A of the yoke 136 provided at the stopper 126 is attracted to the fixed iron core 150A of the magnet 150, the slider 142 becomes unable to move, and the key lock state B (the lock state) arises. In this key lock state B, the abutment surface 212A of the lock cam 208 abuts the inclined surface of the distal end of the slide wall 144. Thus, the ignition key 210 cannot be operated from the key rotation operation position 238 (the ACC position) to the key insertion/removal possible position 240 (the LOCK position) and cannot be pulled out.

Further, the present embodiment is structured such that the shift lever device 10 is set on a floor surface within a vehicle. However, a structure may be used in which the shift lever device is set at an instrument panel within a vehicle.

Next, a shift lock mechanism 300 (lock mechanism) relating to a second embodiment will be described on the basis of FIGS. 22 through 26.

Figure 22:
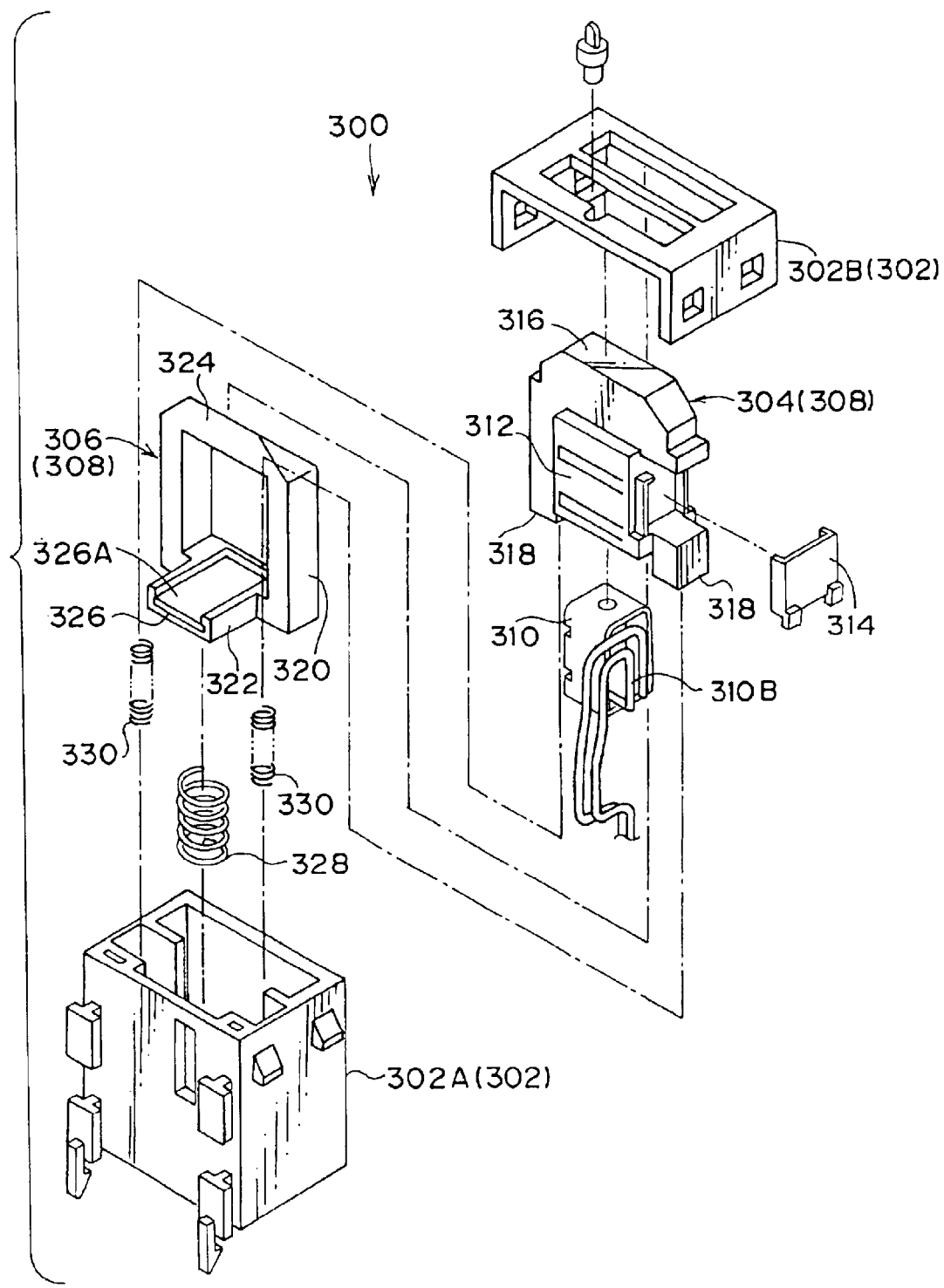
FIG. 22 is an exploded perspective view showing a shift lock mechanism relating to a second embodiment.
Figure 23:
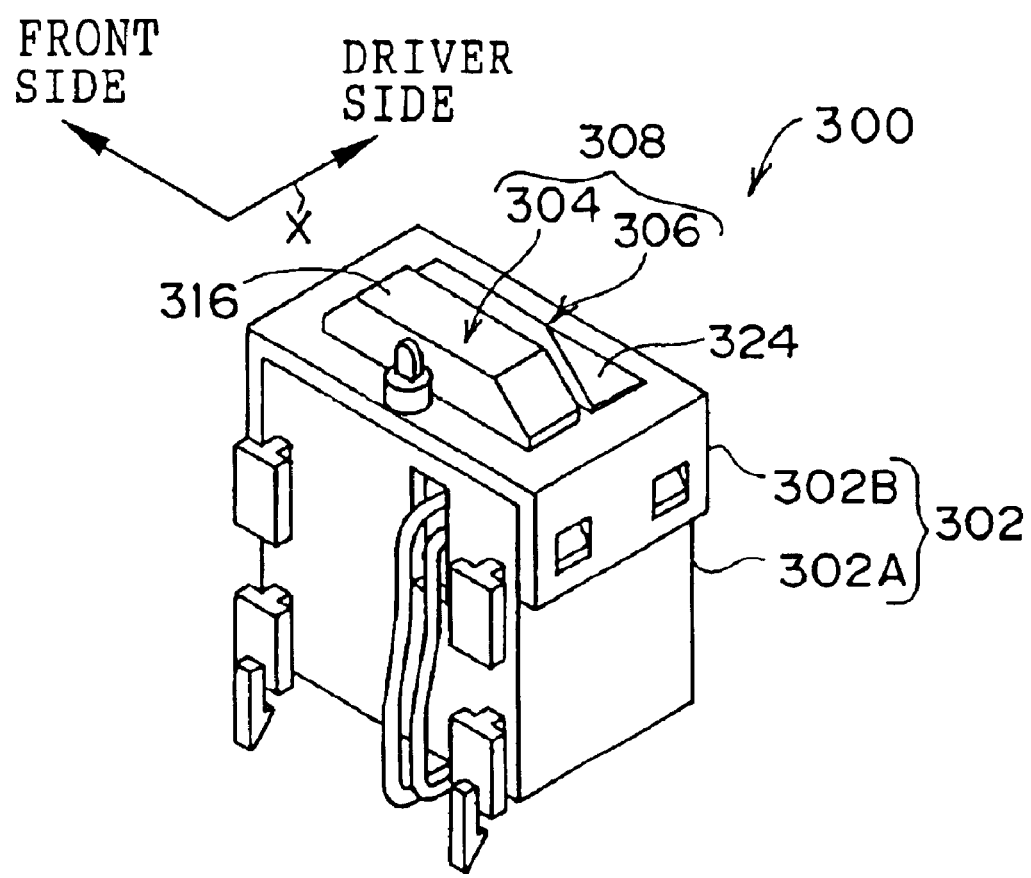
FIG. 23 is an assembly perspective view showing the shift lock mechanism relating to the second embodiment.

As shown in FIG. 22 and FIG. 23, the shift lock mechanism 300 is equipped with a case 302 which is formed from a case main body 302A and a cover 302B which is covered on the top end portion of the case main body 302A at the side opposite the bottom portion; a lock member 308 having an anchor member 304 and a releasing member 306 which are movably accommodated within the case 302; and an electromagnet 310 which is accommodated within the anchor member 304.

The anchor member 304 of the aforementioned lock member 308 is equipped with an accommodating portion 312 in which the aforementioned electromagnet 310 is inserted and fixed from below and in which a fixed iron core 310A (see FIGS. 26A–C) of the electromagnet 310 is open facing downwardly; a cap 314 which is fit on one side of the accommodating portion 312 so as to close a wiring 310B side of the electromagnet 310 in a state in which the electromagnet 310 is accommodated; a stopper portion 316 which projects upwardly of the accommodating portion 312; and spring supporting portions 318 provided so as to face downwardly at both sides of the accommodating portion 312.

The releasing member 306 of the aforementioned lock member 308 is equipped with a slider 320 which forms an L-shape and is a frame-shape extending in vertical directions; and a loading stand portion 322 which projects from the bottom end of the slider 320. An abutment portion 324 is formed at the top end portion of the slider 320. A yoke 326 is fit into the loading stand portion 322, and a attraction surface 326A on the yoke 326 is open upwardly.

Figure 24:
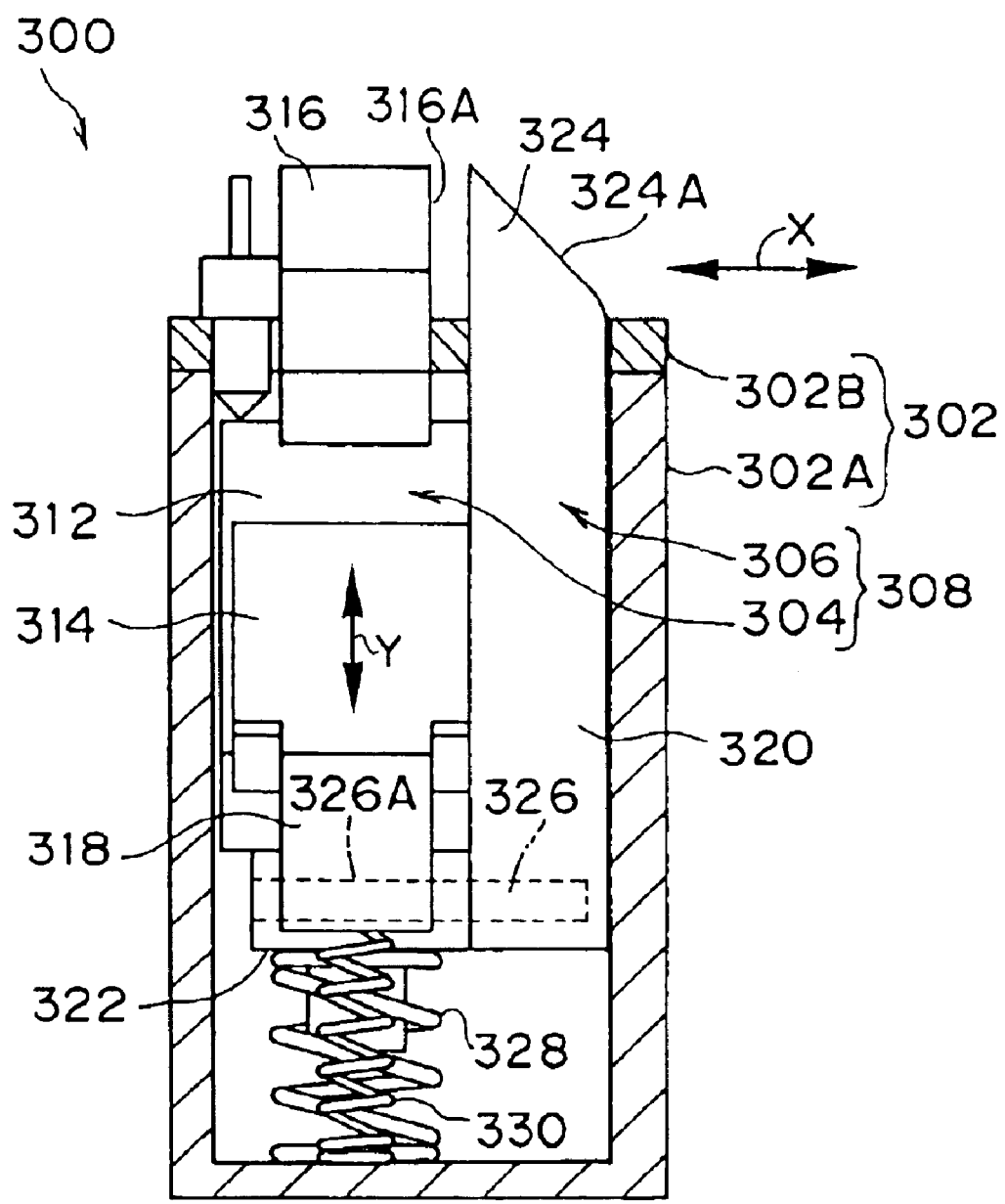
FIG. 24 is a cross-sectional view showing an inner portion of the shift lock mechanism relating to the second embodiment.

As shown in FIG. 24, in a state in which the anchor member 304 and the releasing member 306 of the aforementioned lock member 308 are accommodated movably within the case main body 302A, the accommodating portion 312 of the anchor member 304 is loaded on the loading stand portion 322 of the releasing member 306, and the fixed iron core 310A of the aforementioned electromagnet 310 opposes the attraction surface 326A of the yoke 326 of the loading stand 322 as shown in FIGS. 26A–C. The both spring supporting portions 318 of the anchor member 304 are adjacent to the both sides of the loading stand portion 322. Moreover, in this accommodating state, the anchor member 304 is placed by the side of the frame-shaped slider 320 of the releasing member 306, and a portion of the accommodating portion 312 of the anchor member 304 is inserted into the frame-shaped slider 320. Further, the stopper member 316 of the anchor member 304 is adjacent to the abutment portion 324 of the slider 320. The aforementioned electromagnet 310 moves together with the aforementioned anchor member 304. The anchor member 304 and the electromagnet 310, and the aforementioned releasing member 306, can move relatively in direction Y of the attracting force F (see FIGS. 26A–C) of the fixed iron core 310A of the electromagnet 310 which works on the attraction surface 326A of the yoke 326 of the releasing member 306.

In addition to the anchor member 304 and the releasing member 306, the aforementioned lock member 308 is provided with a large-diameter compression coil spring 328 (spring) which press-contacts the releasing member 306, and a pair of small-diameter compression coil springs 330 (springs) which press-contact the anchor member 304. The large-diameter compression coil spring 328 is placed within the aforementioned case main body 302A on the bottom portion thereof, and is fit to the bottom side of the loading stand portion 322 of the releasing member 306. Both small-diameter compression coil springs 330 are placed within the aforementioned case main body 302A on the bottom portion thereof, and are inserted into the both spring supporting portions 318 of the anchor member 304. Due to the elastic forces of the compression coil springs 328, 330, the anchor member 304 and the releasing member 306 are urged upward, and the stopper portion 316 of the anchor member 304 and the abutment portion 324 of the releasing member 306 can project upwardly from the cover 302B of the case 302. An anchor surface 316A is formed along the aforementioned attracting force direction Y at a side of the stopper portion 316 of the anchor member 304 which side faces the abutment portion 324 of the releasing member 306. An anchor releasing surface 324A is formed at the abutment portion 324 of the releasing member 306 at the side opposite the stopper portion 316. The anchor releasing surface 324A is inclined with respect to the aforementioned attracting force direction Y so as to move away from the anchor surface 316A of the stopper portion 316, heading from top to bottom.

Figure 25:
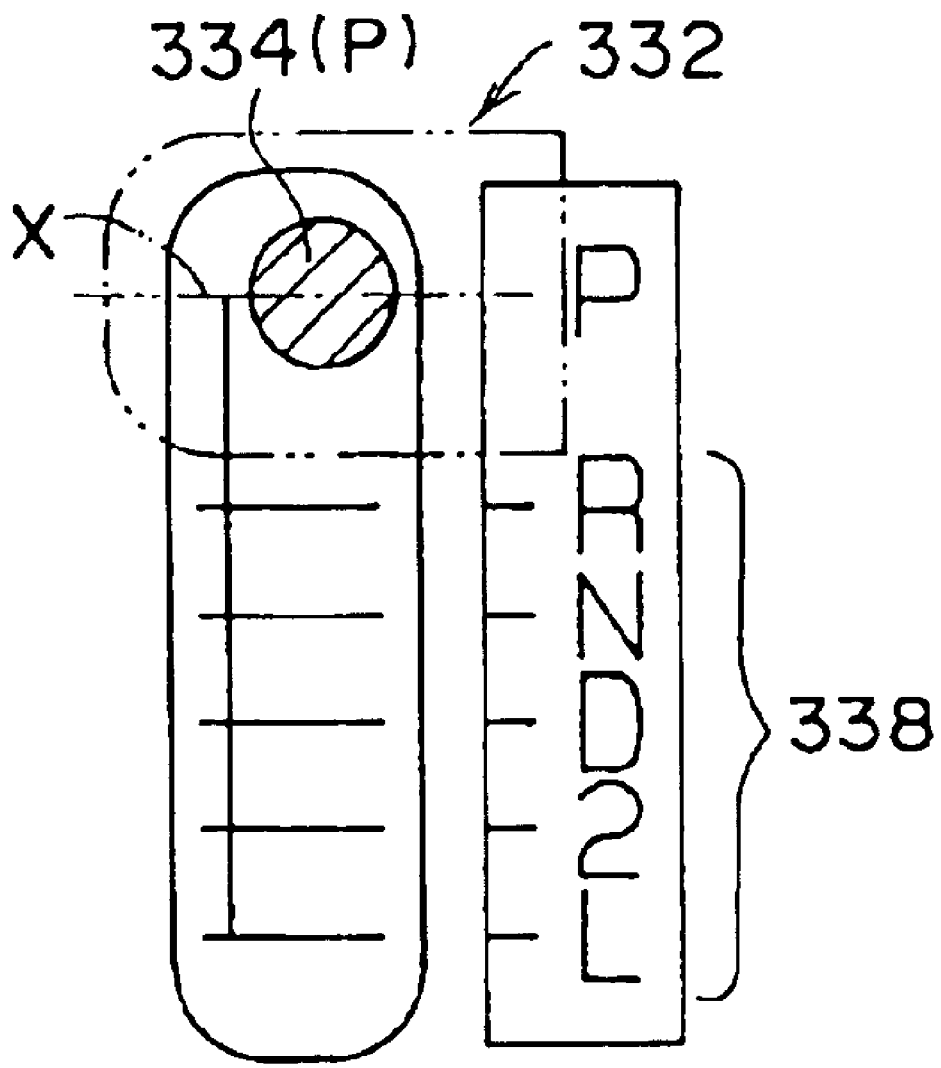
FIG. 25 is a plan view schematically showing a shift operation portion of an automobile relating to the second embodiment.
Figure 26:
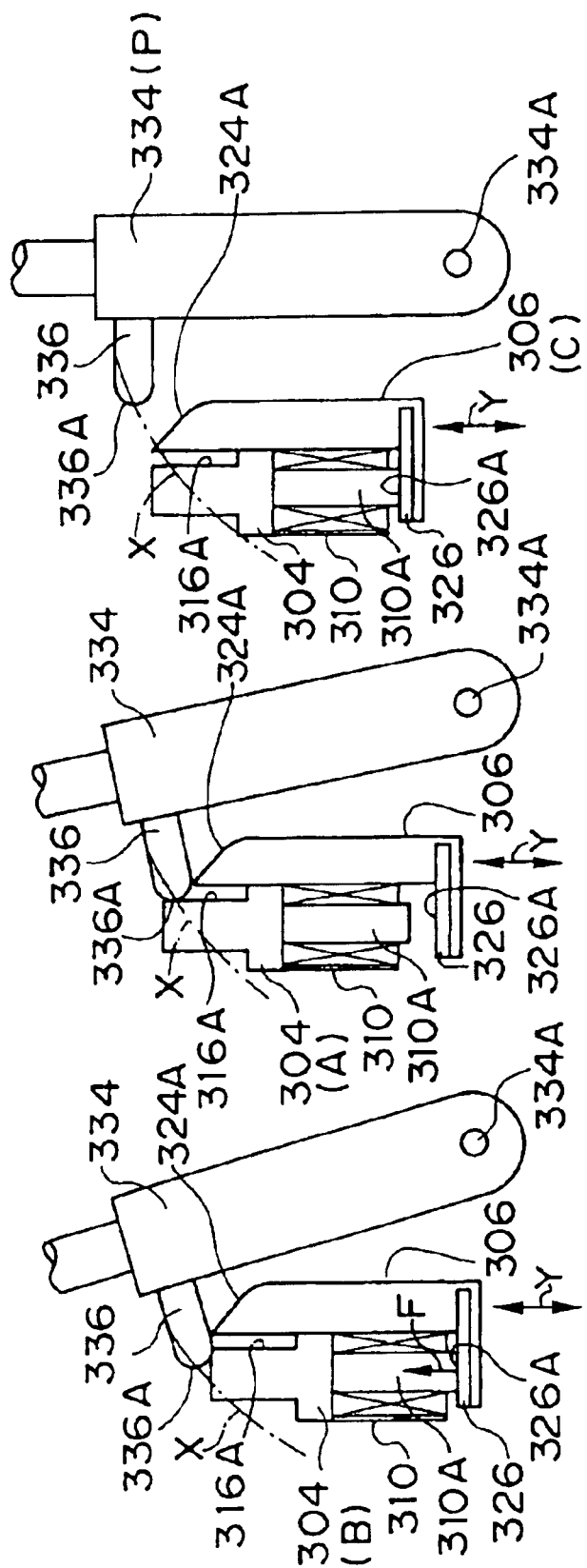
FIGS. 26A–C are explanatory diagrams showing a lock operation and a lock releasing operation in the shift lock mechanism relating to the second embodiment.
Figure 27:
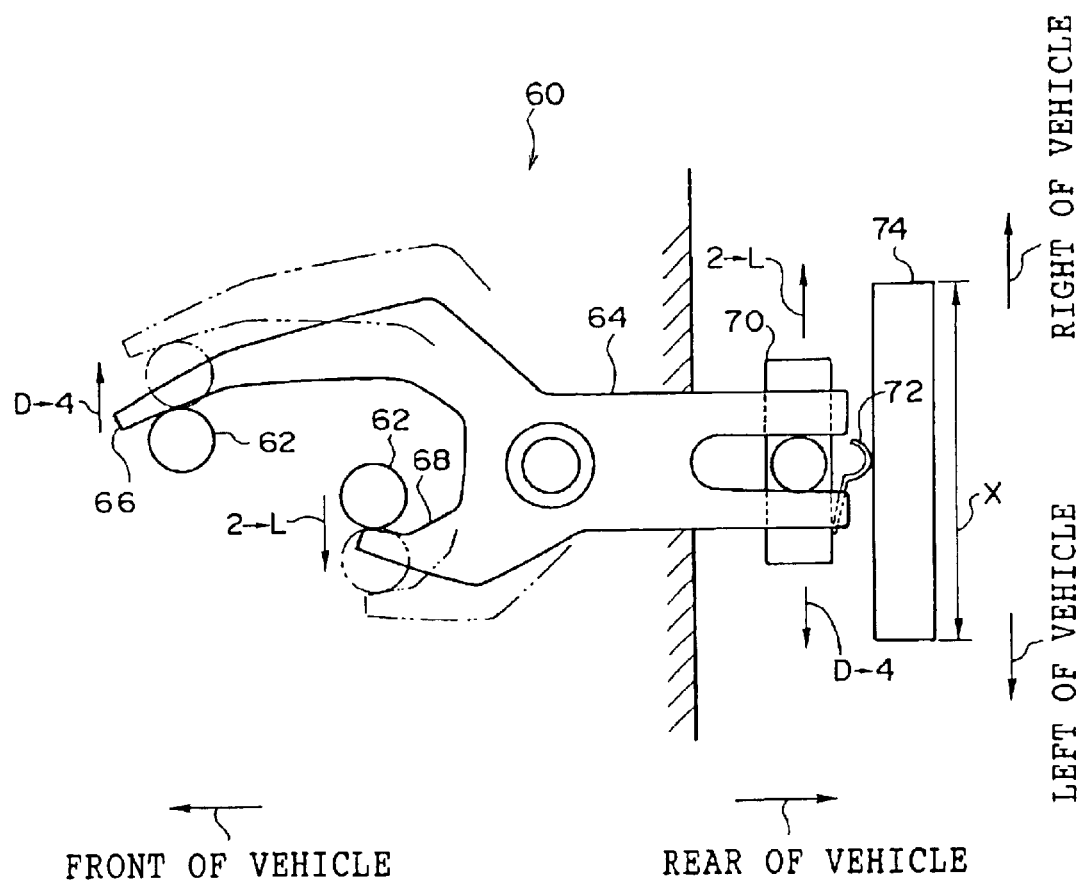
FIG. 27 is a plan view showing main portions of a conventional shift lever device.
Figure 28:
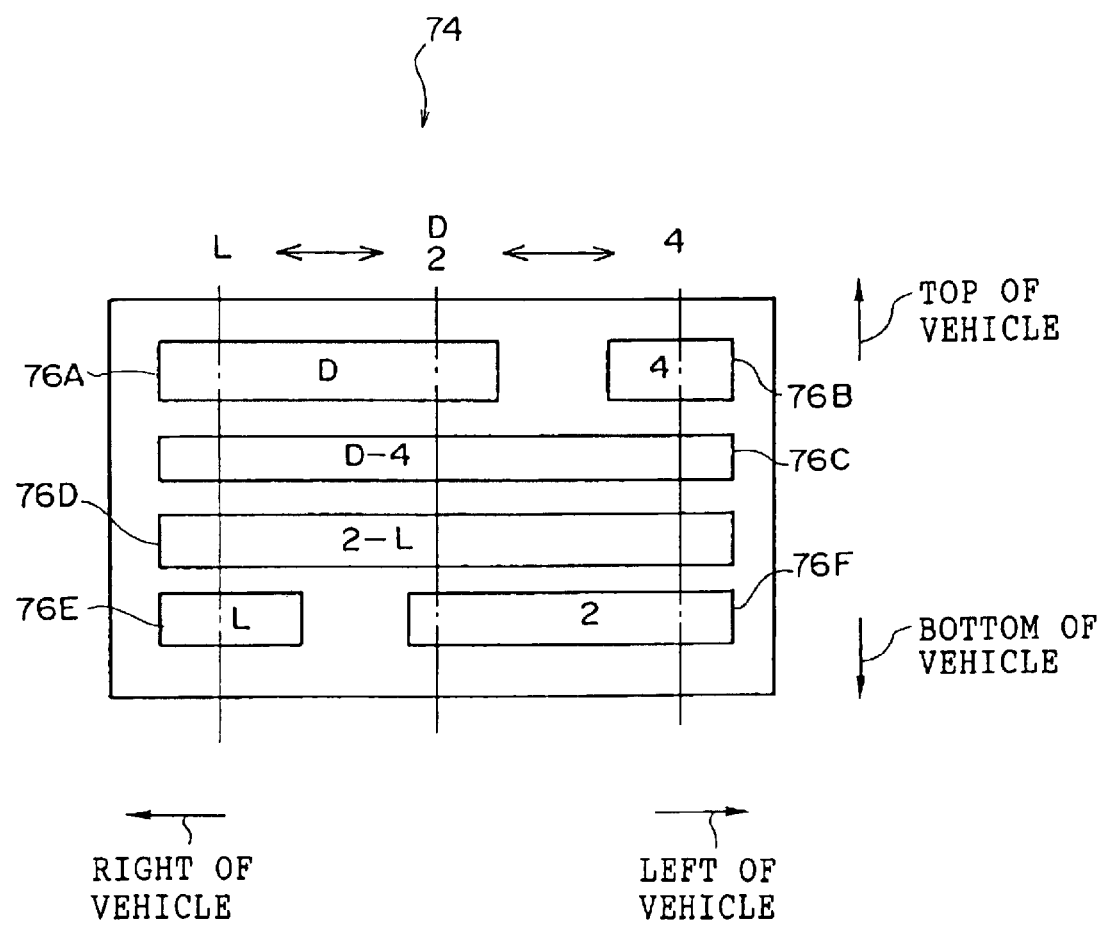
FIG. 28 is a front view showing terminals of a detecting member in a conventional shift lever device.

In a gate-type shift operation portion 332 of an automobile shown in FIG. 25, a shift lever 334 (operation member) is supported so as to be rotatable around a supporting shaft 334A in a vicinity of the aforementioned anchor member 304 and releasing member 306, as shown in FIGS. 26A–C which schematically illustrates one portion. The shift lever 334 has a projection 336, which serves as an interlocking member and as a portion to be locked, in a vicinity of the stopper portion 316 of the anchor member 304 and the abutment portion 324 of the releasing member 306. An abutment surface 336A, which is used as both an anchor surface and an anchor releasing surface, is formed at the distal end portion of the projection 336. At the anchor surface 316A of the stopper portion 316 of the anchor member 304 and the anchor releasing surface 324A of the abutment portion 324 of the releasing member 306, the moving directions thereof (direction Y of the attracting force F of the aforementioned electromagnet 310) intersect a direction X of a locus of rotation of the abutment surface 336A of the projection 336 rotating around the aforementioned supporting shaft 334A at park position P (the specific position) of the shift lever 334.

In the state shown in FIG. 26A, the shift lever 334 shown in FIG. 25 is operated at the park position P. Both the anchor member 304 and the releasing member 306 of the aforementioned lock member 308 are urged upwardly by the respective compression coil springs 328, 330 (see FIG. 24) and stop. Within the anchor member 304, the fixed iron core 310A of the electromagnet 310 which is in a demagnetized state and the attraction surface 326A of the yoke 326 of the releasing member 306 abut one another. In this case, the releasing member 306 is in engageable state C, and the projection 336 of the shift lever 334 faces the anchor releasing surface 324A of the abutment portion 324 of the releasing member 306 and stops.

In a case in which, in a state in which the brake (not shown) is not depressed at the time of starting, an attempt is made to operate the shift lever 334 shown in FIG. 25 from the park position P to a position 338 other than the park position P, it is structured electrically such that the demagnetized state of the aforementioned electromagnet 310 is maintained and the attracting force F thereof is cancelled. Thus, when the abutment surface 336A of the projection 336 of the shift lever 334 presses the anchor releasing surface 324A of the abutment portion 324 of the releasing member 306, as shown in FIG. 26B, only the releasing member 306 moves downward against the elastic force of the compression coil spring 328, and the lever lock state A (lock state), in which the fixed iron core 310A of the electromagnet 310 and the attraction surface 326A of the yoke 326 are separated from one another, arises. In this lever lock state A, the abutment surface 336A of the projection 336 of the shift lever 334 abuts the anchor surface 316A of the stopper portion 316 of the anchor member 304. Thus, the shift lever 334 cannot be operated from the park position P to the position 338 other than the park position P.

In a case in which, in a state in which the brake (not shown) is depressed at the time of starting, an attempt is made to operate the shift lever 334 shown in FIG. 25 from the park position P to the position 338 other than the park position P, it is structured electrically such that the aforementioned electromagnet 310 is excited and the attracting force F thereof is generated. Thus, when the abutment surface 336A of the projection 336 of the shift lever 334 presses the anchor releasing surface 324A of the abutment portion 324 of the releasing member 306, as shown in FIG. 26C, the fixed iron core 310A of the electromagnet 310 and the attraction surface 326A of the yoke 326 are attracted to one another, and the lever unlock state B (unlock state), in which the releasing member 306 and the anchor member 304 integrally move downward against the elastic forces of the respective compression coil springs 328, 330, arises. In this lever unlock state B, the abutment surface 336A of the projection 336 of the shift lever 334 can pass by without abutting the anchor surface 316A of the stopper portion 316 of the anchor member 304. Thus, the shift lever 334 can be operated from the park position P to the position 338 other than the park position P.

In the lever unlock state B shown in FIG. 26C, in a case in which the shift lever 334 is rotated to the park position P, the electromagnet 310 in the excited state is demagnetized, the attracting force F thereof is cancelled, and the state shown in FIG. 26A is returned to. Further, in the lever lock state A shown in FIG. 26B, in a case in which the shift lever 334 is rotated to the park position P, the state shown in FIG. 26A is returned to with the demagnetized state of the aforementioned electromagnet 310 maintained and the attracting force F thereof remaining cancelled.

In accordance with this shift lock mechanism 300, the attracting force F of the fixed iron core 310A of the electromagnet 310 is used in the switching between the lever lock state A and the lever unlock state B. Thus, as compared with a conventional case utilizing the plunger (movable iron core) of an electromagnetic solenoid, the rising and falling of the iron core 310A can be eliminated and the mechanism can be made compact. Further, the movement of the iron core 310A can be suppressed, and the amount of electric power can be reduced.

Moreover, in the lever lock state A in which the brake is not depressed, the electromagnet 310 is un-energized. Thus, the amount of electric power can be reduced even more.

Further, due to the anchor member 304 and the releasing member 306 which form the lock member 308, the switching between the lever lock state A and the lever unlock state B can be carried out smoothly by utilizing the attracting force F of the fixed iron core 310A of the electromagnet 310.

Moreover, the anchor member 304 and the releasing member 306 which form the lock member 308 can be brought together compactly, and the mechanism can be made more compact.

Further, due to the compression coil spring 330 of the lock member 308 which urges the anchor member 304 to return to the lever lock state A from the lever unlock state B, switching between the lever lock state A and the lever unlock state B can be carried out even more smoothly by utilizing the attracting force F of the fixed iron core 310A of the electromagnet 310.

Moreover, due to the compression coil spring 328 of the lock member 308 which urges the releasing member 306 to return to the aforementioned engageable state C, switching between the lever lock state A and the lever unlock state B can be carried out even more smoothly by utilizing the attracting force F of the fixed iron core 310A of the electromagnet 310.

Note that, in the present embodiment, both the anchor member 304 and the releasing member 306 of the lock member 308 can move with respect to the case 302, and the anchor member 304 and the electromagnet 310 can move integrally. In a case in which this structure is the same but the orientation or the place of setting the present mechanism is changed and the mechanism is disposed, there is no need to provide the portion to be locked, which corresponds to the aforementioned projection 336, integrally with the shift lever 334, and no need to provide the fulcrum of rotation which is the supporting shaft 334A. The portion to be locked may be interlocked with the shift lever 334 via a link mechanism or the like.

Moreover, the present embodiment is structured such that the shift lock mechanism 300 is applied to the gate-type shift operation portion 332. However, a structure may be used in which the shift lock mechanism is applied to a tiptronic-type gate-type or a straight-type (including a tiptronic-type) shift operation portion.

INDUSTRIAL APPLICABILITY

As described above, the lock mechanism of the present invention is useful as a lock mechanism which carries out switching between a lock state and an unlock state, and is suited to, by utilizing the attracting force of a fixed iron core of an electromagnet, eliminating rising and falling of the iron core and making the mechanism compact, and suppressing movement of the iron core and reducing the amount of electric power.

Moreover, the shift lever device of the present invention is useful as a gate-type shift lever device, and is suited for making the placement space of a second detecting portion compact and thus making the device more compact.

Further, the shift lock unit of the present invention is useful for a gate-type shift lever device in particular, and is suited for aiming for compactness.

What is claimed is:

1. A lock mechanism applied to a shift lever device and having a function by which an operation member cannot be operated to a predetermined position, comprising:

an interlocking member which can interlock with operation of the operation member, and a lock member having an electromagnet and a magnetically attractable portion which is engageable with and releasable from the interlocking member, wherein, in accordance with an attracting force between an iron core of the electromagnet and said magnetically attractable portion, the lock member can assume a lock state in which the lock member makes operation of the operation member to the predetermined position impossible and an unlock state in which the lock member makes operation of the operation member to the predetermined position possible, said iron core being fixed relative to said electromagnet, and being mechanically separate from said magnetically attractable portion.

2. The lock mechanism according to claim 1, wherein the lock mechanism is a shift lock mechanism in which the operation member is a shift lever, the predetermined position is a a position other than a specific position of the shift lever, and the interlocking member is a portion to be locked which can interlock with operation of the shift lever, and the shift lock mechanism has a function by which the shift lever cannot be operated from the specific position to a position other than the specific position.

3. The lock mechanism according to claim 2, wherein the lock state, attracting force of the fixed iron core of the electromagnet is cancelled and the lock member anchors with the interlocking member, and in the unlock state, the attracting force of the fixed iron core of the electromagnet is generated and anchoring of the lock member with respect to the interlocking member can be cancelled.

4. The lock mechanism according to claim 3, wherein the lock member includes an anchor member having an anchor surface which, in the lock state, abuts an anchor surface provided at the interlocking member, and a releasing member which has an anchor releasing surface which can abut an anchor releasing surface provided at the interlocking member,
the electromagnet moves together with one of the anchor member and the releasing member, and the electromagnet and the one of the anchor member and the releasing member are movable relative to another of the anchor member and the releasing member, and the other of the anchor member and the releasing member has a attraction surface which is attracted to the fixed iron core of the electromagnet in the unlock state, and
the releasing member assumes an engageable state in which the releasing member can engage with the anchor releasing surface of the interlocking member at the anchor releasing surface of the releasing member, and accompanying this engagement, the releasing member can set the anchor member in a lock state in a state in which attraction from the electromagnet is cancelled, and can set the anchor member in an unlock state in a state of being attracted to the electromagnet.

5. The lock mechanism according to claim 4, wherein at least one of the anchor member and the releasing member of the lock member moves in a direction of attracting force of the fixed iron core of the electromagnet which works on the attraction surface, and
at least one of an anchor surface of the anchor member and an anchor releasing surface of the releasing member intersects a direction of a locus of movement of at least one of the anchor surface and the anchor releasing surface of the interlocking member and moves in a direction of the attracting force.

6. The lock mechanism according to claim 4, wherein lock member includes a spring which urges the anchor member to return to the lock state from the unlock state.

7. The lock mechanism according to claim 4, wherein the lock member is equipped with a spring which urges the releasing member to return to the engageable state.

8. The lock mechanism according to claim 1, wherein the lock mechanism is a key interlock mechanism in which the operation member is an ignition key, the predetermined position is a key insertion/removal possible position of the ignition key, and the interlocking member is a member to be locked which can interlock with respect to rotation operation of the ignition key, and
the key interlock mechanism has a function by which the ignition key cannot be switched from a key rotation operation position to the key insertion/removal possible position in a state in which the shift lever is operated to a position other than a park position.

9. The lock mechanism according to claim 1, wherein, in the lock state, the lock member is attracted by the electromagnet and anchors the interlocking member, and in the unlock state, attraction from the electromagnet is cancelled and anchoring of the lock member with respect to the interlocking member can be cancelled.

10. The lock mechanism according to claim 9, wherein the lock member has at least a releasing member of among an anchor member having an anchor surface which, in the lock state, abuts an anchor surface provided at the interlocking member,
at least the releasing member of among the anchor member and the releasing member of the lock member can move with respect to the electromagnet, and one of the anchor member and the releasing member which can move with respect to the electromagnet has a attraction surface which is attracted to the fixed iron core of the electromagnet in the lock state,
at least the releasing member of among the anchor member and the releasing member of the lock member can, in the lock state, move with respect to the attraction surface attracted to the fixed iron core of the electromagnet, and at least one of the anchor member and the releasing member, which can move with respect to the attraction surface, can move together with the electromagnet, and
the releasing member can assume an engageable state in which the releasing member can engage with the anchor releasing surface of the interlocking member at the anchor releasing surface of the releasing member, and accompanying this engagement, at least one of the anchor member and the releasing member can assume the lock state and the unlock state.

11. The lock mechanism according to claim 10, wherein the anchor member and the releasing member of the lock member are movable relative to one another, and the lock member is equipped with a spring which urges the anchor member to return to the unlock state form the lock state.

12. The lock mechanism according to claim 1, wherein the lock mechanism comprises a yoke which is provided so as to be freely inclinable in correspondence with the electromagnet, and which adheres to the electromagnet due to magnetic force when the electromagnet generates the magnetic force.

13. The lock mechanism according to claim 12, wherein the lock mechanism comprises a holding claw which is provided so as to project in an L-shape in cross-section toward the electromagnet side, and which makes the yoke freely inclinable by supporting an end portion of the yoke.

14. The lock mechanism according to claim 12, wherein the lock mechanism comprises a cushion which is elastic and pushes the yoke toward the electromagnet side.

15. The lock mechanism according to claim 1, wherein the lock member includes an anchor member having an anchor surface which, in the lock state, abuts an anchor surface provided at the interlocking member, and a releasing member which has an anchor releasing surface which can abut an anchor releasing surface provided at the interlocking member.

16. The lock member according to claim 15, wherein the electromagnet move together with one of the anchor member and the releasing member.

17. The lock member according to claim 16, wherein the electromagnet and the one of the anchor member and the releasing member are movable relative to another of the anchor member and the releasing member and the magnetically attractable portion of the lock member is an attraction surface on the other of the anchor member and the releasing member.

18. A shift lever device comprising:
a shift lever provided so as to be tunable in a predetermined direction and toward both sides of the predetermined direction, and due to a turning position in the predetermined direction being changed, a first shift position and a second shift position are changed, and by being turned toward one side of the predetermined direction from the first shift position, the shift lever is changed to a third shift position, and by being turned toward another side of the predetermined direction from the second shift position, the shift lever is changed to a fourth shift position;

a link provided so as to be rotatable in correspondence with the shift lever, the link being rotated in a same specific direction by the shift lever when the shift lever is changed from the first shift position to the third shift position and when the shift lever is changed from the second shift position to the fourth shift position;

a first detecting portion connected to the shift lever, and detecting the turning position, in the predetermined direction, of the shift lever; and a second detecting portion connected to the link, and detecting a rotational position of the link.

19. The shift lever device according to claim 18, wherein a rotation central axis of the link is disposed between the first shift position and the second shift position of the shift lever, and the link is rotatable substantially parallel to a plane of turning, in the predetermined direction, of the shift lever, and the link has a first arm corresponding to the third shift position of the shift lever and a second arm corresponding to the fourth shift position of the shift lever, and when the shift lever is changed from the first shift position to the third shift position, the shift lever displaces the first arm toward one of a distal end side and a proximal end side of the shift lever and rotates the link in the specific direction, whereas when the shift lever is changed from the second shift position to the fourth shift position, the shift lever displaces the second arm toward another of the distal end side and the proximal end side of the shift lever and rotates the link in the specific direction, whereas when the shift lever is changed from the second shift position to the fourth shift position, the shift lever displaces the second arm toward another of the distal end side and the proximal end side of the shift lever and rotates the link in the specific direction.

20. The shift lever device according to claim 18, wherein the first detecting portion transmits, to the second detecting portion, a signal regarding a detected turning position, in the predetermined direction, of the shift lever, and the second detecting portion switches a transmission direction of the received signal on the basis of a detected rotational position of the link.

21. A shift lock unit forming a shift lever device which is equipped with:

a shift lever provided so as to be turnable in a predetermined direction, and toward both sides of the predetermined direction, and due to a turning position in the predetermined direction being changed, a first shift position and a second shift position are changed, and by being turned toward one side of the predetermined direction from the first shift position, the shift lever is changed to a third shift position, and by being turned toward another side of the predetermined direction from the second shift position, the shift lever is changed to a fourth shift position;

and a first detecting portion connected to the shift lever, and detecting the turning position, in the predetermined direction, of the shift lever, wherein the shift lock unit integrally comprises:

a shift lock mechanism having a function by which the shift lever cannot be operated from a specific position to a position other than the specific position; and a sensing mechanism which senses a change from the first shift position of the shift lever to the third shift position, and a change from the second shift position of the shift lever to the fourth shift position.

22. The shift lock unit according to claim 21, wherein the sensing mechanism includes:

a link provided so as to be rotatable in correspondence with the shift lever, the link being rotated in a same specific direction by the shift lever when the shift lever is changed from the first shift position to the third shift position and when the shift lever is changed from the second shift position to the fourth shift position; and a second detecting portion connected to the link, and detecting a rotational position of the link.

23. The shift lock unit according to claim 22, wherein the shift lock unit comprises a guide portion which is provided in correspondence with the link, and which guides rotation, in the specific direction, of the link.

24. The shift lock unit according to claim 22, wherein the shift lock unit comprises:

a restoring member provided at the link, and applying torque in a direction opposite the specific direction to the link and restoring the link to an initial rotational position; and an elastic member which is elastic and which the link, which is restored to the initial rotational position, abuts.

25. The shift lock unit according to claims 21, wherein the shift lock unit comprises a shift position detecting portion which detects that the shift lever is positioned at a specific shift position.

* * * * *